(12) United States Patent
Smith et al.

(10) Patent No.: US 12,485,625 B2
(45) Date of Patent: Dec. 2, 2025

(54) HANDHELD TUBING WELDER

(71) Applicant: Life Technologies Corporation, Carlsbad, CA (US)

(72) Inventors: Mark Thomas Smith, Nibley, UT (US); Tony Wentai Hsiao, Providence, UT (US); Brycen Hal Mills, Millville, UT (US)

(73) Assignee: Life Technologies Corp., Carlsbad, CA (US)

( * ) Notice: Subject to any disclaimer, the term of this patent is extended or adjusted under 35 U.S.C. 154(b) by 97 days.

(21) Appl. No.: 18/598,967

(22) Filed: Mar. 7, 2024

(65) Prior Publication Data

US 2024/0308151 A1    Sep. 19, 2024

Related U.S. Application Data

(60) Provisional application No. 63/452,131, filed on Mar. 14, 2023.

(51) Int. Cl.
*B29C 65/74* (2006.01)
*B29C 65/00* (2006.01)

(52) U.S. Cl.
CPC ...... *B29C 65/743* (2013.01); *B29C 66/02241* (2013.01); *B29C 66/5221* (2013.01)

(58) Field of Classification Search
CPC .............. B29C 65/743; B29C 65/7841; B29C 65/7802; B29C 65/2046; B29C 66/02241; B29C 66/5221; B29C 66/857; B29C 66/91421; B29C 65/2084
USPC ........................................................ 156/251
See application file for complete search history.

(56) References Cited

U.S. PATENT DOCUMENTS 6,637,489 B1 * 10/2003 Spencer ................ B29C 66/857
156/499

* cited by examiner

*Primary Examiner* — James D Sells

(57) ABSTRACT

Systems and methods for handheld tubing welders are herein disclosed. In an embodiment, a handheld tubing welder can include a housing configured to be held by a user and a tubing retainer coupled to the housing. The tubing retainer can include a first and second retainer slot configured to receive and retain a first section of a first tubing and a second tubing, respectively. A tubing shifter can be positioned adjacent to the housing and the tubing retainer, the tubing shifter includes a first shifter slot and a second shifter slot that is configured to receive and retain a second section of the first tubing and a second section of the second tubing, respectively. A cutting element can be configured to be movable between the tubing shifter and the tubing retainer to cut the first and second tubing extending between the tubing shifter and tubing retainer. A heating element can be configured to heat the cutting element to a temperature range that allows the first section of the second tubing to thermally weld to the second section of the first tubing.

20 Claims, 18 Drawing Sheets

HANDHELD TUBING WELDER

CROSS-REFERENCE TO RELATED APPLICATIONS

This application claims the benefit of U.S. Provisional Application No. 63/452,131, filed on Mar. 14, 2023, which is incorporated herein by specific reference.

BACKGROUND

In bioprocessing, many components are provided pre-sterilized to ensure there is no contamination within a given component; however, possible biological ingress can occur when coupling various pre-sterilized components together. To address this, many components include tubing that can be thermally welded to one-another. At least some currently available tubing welders are large, heavy, and unidimensional preventing easy transportation and use within industrial processes, including divers sets of equipment, such as equipment installed in hard-to reach areas. For example, at least some currently available tubing welders require power outlets and are not portable or capable of welding multiple types of tubing elements encountered in modern industrial and bioproduction processes. Such limitations prevent welding in a variety of locations across a variety of tubing and equipment, ultimately increasing the probability of system and product contamination. Improved handheld tubing welders are disclosed herein.

SUMMARY OF THE DISCLOSURE

It is understood that each independent aspect recited herein may include any of the features, options, and possibilities recited in association with the other independent aspects set forth above or as recited elsewhere within this document.

Example systems for handheld tubing welders are herein disclosed. Example systems for handheld tubing welders can include a housing configured to be held by a user and a tubing retainer coupled to the housing. The tubing retainer can include a first retainer slot and a second retainer slot configured to receive and retain a first section of a first tubing and a second tubing, respectively. A tubing shifter can be positioned adjacent to the housing and the tubing retainer, and the tubing shifter includes a first shifter slot and a second shifter slot that is configured to receive and retain a second section of the first tubing and a second section of the second tubing, respectively. A cutting element can be configured to be movable between the tubing shifter and the tubing retainer to cut the first and second tubing extending between the tubing shifter and tubing retainer. A heating element can be configured to heat the cutting element to a temperature range that allows the first section of the second tubing to thermally weld to the second section of the first tubing.

In various embodiments, a method for using a handheld welder is provided. A first tubing can be received by a first elongate slot defined by a tubing shifter and a tubing retainer of a handheld tubing welder, and a second tubing can be received by a second elongate slot defined by the tubing shifter and the tubing retainer, the first elongate slot and the second elongate slot being parallel to one another. A cutting element can be heated by a heating element to a temperature within a temperature range, and the first tubing and the second tubing can be cut by the heated cutting element, to form a cut across the first tubing and the second tubing, thereby forming a first and second section of the first tubing and a first and second section of the second tubing. The tubing shifter can be rotated to approximately align the first section of the second tubing and the second section of the first tubing, and the tubing shifter can be translated towards the tubing retainer to abut the first section of the second tubing to the second section of the first tubing to thereby allow the first section of the second tubing to thermally weld to the second section of the first tubing.

In various embodiments, a handheld tubing welder system is provided that includes a first tubing, a second tubing, and a handheld tubing welder. The handheld tubing welder can comprise a housing that is configured to be held by a user, and a tubing retainer can be coupled to the housing, the tubing retainer including a first retainer slot and a second retainer slot that are configured to receive and retain a first section of a first tubing and a first section of a second tubing, respectively. A tubing shifter can be positioned adjacent the housing and the tubing retainer, the tubing shifter including a first shifter slot and a second shifter slot that can be configured to receive and retain a second section of the first tubing and a second section of the second tubing, respectively. A cutting element can be configured to be movable between the tubing shifter and the tubing retainer to cut the first tubing and second tubing extending between the tubing shifter and tubing retainer. A heating element can be configured to heat the cutting element to a temperature range that allows the first section of the second tubing to thermally weld to the second section of the first tubing.

In various embodiments, an adjustable handheld tubing welder system is provided. The adjustable handheld tubing welder comprises a housing configured to be held by a user, and a tubing retainer coupled to the housing. The tubing retainer includes a first set of retainer slots and a second set of retainer slots, each configured to receive and retain sections of tubing of different sizes, including a first and a second tubing. A tubing shifter can be positioned adjacent to the tubing retainer, which includes a first set of shifter slots and a second set of shifter slots that are each configured to receive and retain the tubing sections of different sizes. A blade can be configured to be movable between the tubing shifter and the tubing retainer to cut the first tubing and the second tubing extending between the tubing shifter and tubing retainer, the first tubing being cut into a first distal section and a first proximal section, and the second tubing being cut into a second distal section and a second proximal section. A heating element can be configured to heat the blade to within a temperature range that allows thermal welding of the first proximal section of the first tubing to a second distal section of the second tubing.

Figure 1A:
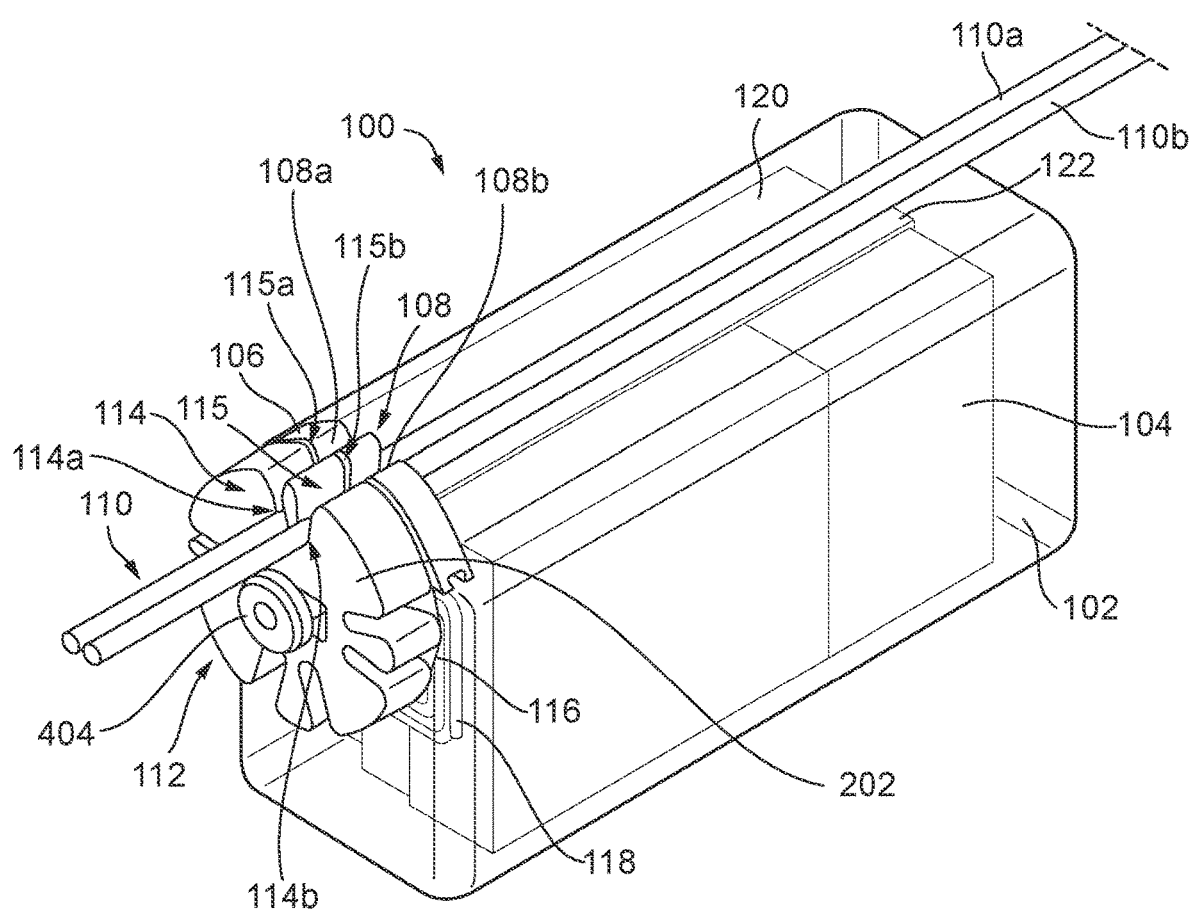
FIG. 1A is a perspective view of a handheld tubing welder according to exemplary embodiments of the present disclosure.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

This disclosure includes various embodiments of a handheld tubing welder that can provide efficient portability and effective thermal welding of tubing or tubing elements in conditions that require minimal contamination of the tubing. Alternatively or in addition, various embodiments of the handheld tubing welder described herein are compact (e.g., fit within an approximately 5 inch by 5 inch by 10 inch block) and relatively light in weight (e.g., approximately 3 pounds to approximately 7 pounds) when compared to at least some current tubing welders, which can allow users to thermally weld tubing in a variety of conditions and locations, including difficult to access areas of industrial equipment within an industrial process. For example, at least some currently available tubing welders are stationary, difficult to transport, bulky, and incapable of welding multiple types and sizes of tubing. As a result, currently available tubing welders are not configured for efficient and effective welding of tubing in industrial processes and equipment that require sterile conditions. The exemplary handheld tubing welders of the present disclosure address current shortcomings in a variety of ways. The exemplary handheld tubing welders are portable, light, compact, and can efficiently and effectively cut, align, and weld together a variety of tubing elements to form a sanitary (e.g. sterilized or partially sterilized) and aligned tubing joint. The aligned tubing joint facilitates fluid flow across the tubing joint and through the welded tubing elements. The exemplary handheld tubing welders can reach, retain, align, cut, and weld tubing associated equipment and equipment surfaces that are difficult to access within an industrial process, such as a bioproduction process. The exemplary handheld tubing welders can also retain, align, cut, and weld multiple types of tubing and tubing elements having different shapes, sizes, materials of construction, inside diameters, and outside diameters.

The example handheld tubing welders disclosed herein can be used to retain, align, cut, and weld tubing that contains or is used to flow one or more biological components, bioprocess fluids, solids, mixtures, solutions and suspensions including, but not limited to, bacteria, fungi, algae, plant cells, animal cells, white blood cells, T-cells, cell media, protozoans, nematodes, plasmids, viral vectors, blood, plasma, organelles, proteins, nucleic acids, lipids, plasmids, carbohydrates, and/or other biological components. By way of example and not by limitation, examples of some common biological components include *E. coli*, yeast, *bacillus*, and CHO cells. Bioprocess fluid can also comprise cell-therapy cultures and cells and microorganisms that are aerobic or anaerobic and adherent or non-adherent. Different media compositions known in the art can be used to accommodate the specific cells or microorganisms grown based on the desired end product.

The example handheld tubing welders disclosed herein can be used to retain, align, cut, and weld tubing used to connect bioprocessing equipment and instruments and flow biological components between bioprocessing equipment and instruments, including, but not limited to, connecting one or more reactors, fermenters, centrifuges, centrifugal separators, chromatography units, mixers, homogenizers, magnetic processing units, blood separating devices, filters, bubble traps, motors, scales, agitators, temperature control units, sensors, and/or other bioprocessing equipment and instruments designed for growing, mixing or processing cells and/or other biological components. It is also appreciated that bioprocessing equipment and instruments can comprise any conventional type of cell culture device, such as a stirred-tank reactor, rocker-type reactor, paddle mixer reactor, or the like. In some uses, bioprocessing equipment and instruments primarily grow and recover cells for subsequent use (e.g., preparing vaccine materials from the cells themselves). But in many uses, the ultimate purpose of growing cells in bioprocessing equipment and instruments is to produce and later recover biological products (such as recombinant proteins, viral vectors, etc.) that are exported from the cells into the growth medium. It is also common to use a bioprocess reactor to grow cells in a master batch to prepare a specific volume, density, concentration, CFU, and/or aliquot of cells for subsequent use as an inoculant for multiple subsequent batches of cells grown to recover biological products.

In some embodiments, the handheld tubing welders of the present disclosure can include a compact housing that at least partially contains a portable power supply coupled to and powering a heating element and any other mechanics required to perform the welding function. The heating element can be configured to provide a sufficient amount of heat for a sufficient amount of time to form at least one weld between two tubing elements, as will be described in greater detail below. The exemplary handheld tubing welders can also include a tubing retainer for retaining a section of tubing (e.g., a first tubing element) in at least one position, such as for welding the section of tubing to form a welded joint. The handheld tubing welders can further include a tubing shifter that is configured to retain another section of tubing (e.g., a second tubing element) in order to reposition such section of tubing for forming the welded joint. For example, the tubing shifter can shift and align the first tubing element with the second tubing element, and position the tubing elements or ends thereof to about one another for forming the welded joint. In some embodiments, the handheld tubing welders include a blade for cutting the tubing elements. In some embodiments, the blade is heated prior to cutting, such as to allow cut ends of the first and second tubing elements to be welded together once the tubing shifter has aligned the first tubing element and the second tubing element. Various embodiments and related methods of handheld tubing welders are described in detail below.

Figure 1B:
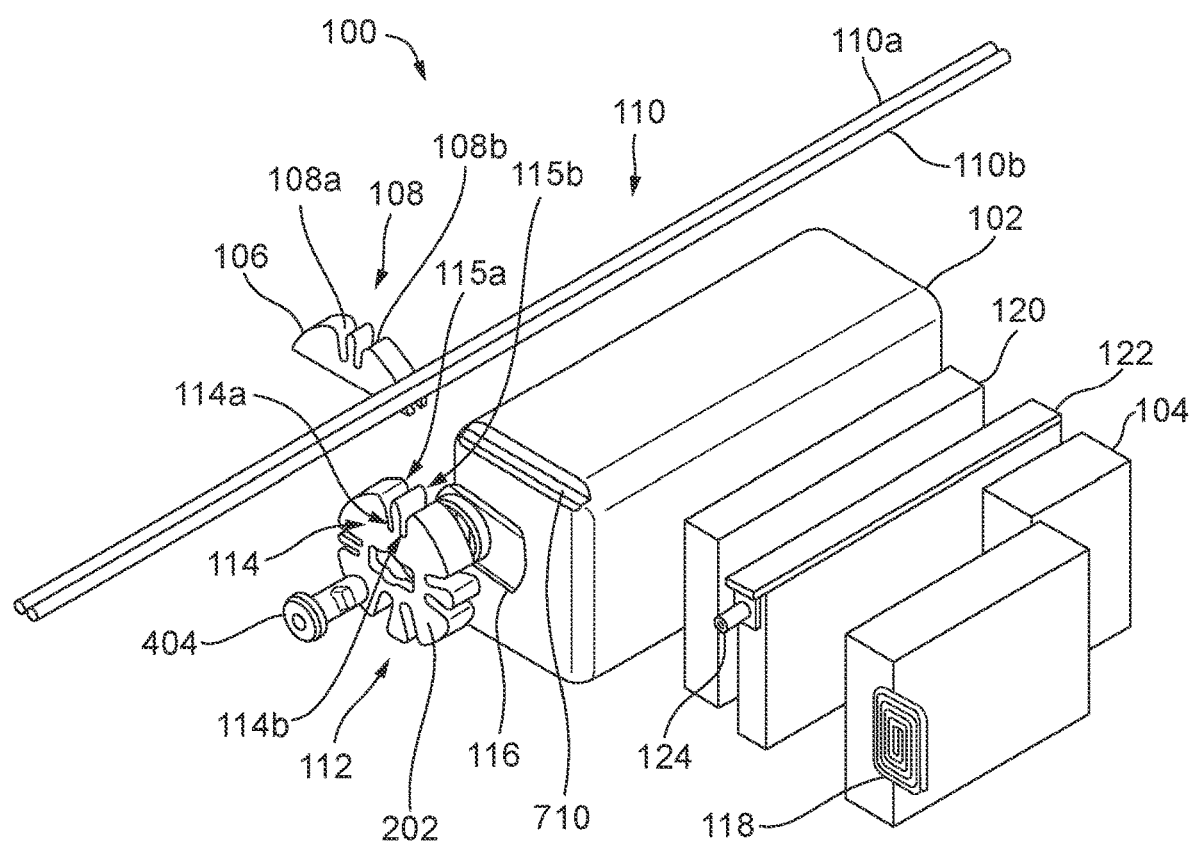
FIG. 1B is a perspective exploded view of a handheld tubing welder according to exemplary embodiments of the present disclosure.

FIGS. 1A and 1B illustrate an embodiment of a handheld tubing welder 100 that is configured to be held by a user for retaining and cutting tubing 110 (e.g., a first tubing 110a and a second tubing 110b), as well as aligning, abutting, and thermally welding two sections of the tubing 110 to form a welded joint. As shown in FIGS. 1A and 1B, the handheld tubing welder 100 can include a housing 102 that is sized to be efficiently portable, such as small enough to be held and transported by a human hand. The housing 102 can at least partially contain a portable power supply 104, for example, a battery (e.g., rechargeable) or a super capacitor. In some embodiments, the handheld tubing welder 100 can include a power cord for coupling to an electrical outlet for powering the handheld tubing welder 100 and/or charging the portable power supply 104. The housing 102 can be constructed of a variety of materials, such as non-ferrous materials (e.g., aluminum, plastic, or ceramic) and/or materials that minimally conduct thermal energy. In general, the housing 102 can be constructed from a material that keeps the housing 102 sufficiently cool such that a human hand is not burned and can comfortably hold the handheld tubing welder 100 during operations of the handheld tubing welder 100.

In some embodiments, the handheld tubing welder 100 includes a tubing retainer 106 for securing tubing 110 relative to at least the housing 102. As shown in FIG. 1A, the tubing retainer 106 can be positioned adjacent to an outer surface of the housing 102. The tubing retainer 106 can include at least one set of two adjacent retainer slots 108 including a first retainer slot 108a and a second retainer slot 108b. The first retainer slot 108a can have a same or similar shape and/or dimensions as the second retainer slot 108b, such as in order to capture and weld tubing 110 having a same or similar shape and/or outer diameter. In some embodiments, the tubing retainer 106 can include retainer slots 108 that do not have the same or similar shape and/or dimensions.

As shown in FIG. 1A, the retainer slots 108 can be configured to receive and retain sections of tubing 110, for example the first retainer slot 108a can be configured to retain a section of the first tubing 110a and the second retainer slot 108b can be configured to retain a section of the second tubing 110b. The retainer slots 108 can be configured to receive sections of the tubing 110 such that the tubing 110 extends at least partly through the tubing retainer 106, as shown in FIG. 1A. The retainer slots 108 can be sized and shaped to receive and capture at least a part of a perimeter or outer surface of the retained section of tubing 110. In exemplary embodiments, the retainer slots 108 can each include a retainer slot opening and a retainer slot tapered portion or space (such as retainer slot opening 111 and retainer slot tapered portion 113 of retainer 106 shown in FIG. 7) that is smaller than the remainder of the retainer slot 108 and/or smaller than an outer diameter of the tubing 110. This tapered portion can cause the tubing 110 to form a friction and/or compression fit with a respective retainer slot 108, such as to secure a position of the tubing 110 within a respective retainer slot 108 or tapered portion thereof, including throughout operations of the handheld tubing welder 100. The retainer slots 108 can be sized and shaped to receive and capture a variety of sized and shaped tubing 110, such as tubing 110 having a variety of diameters.

As shown in FIG. 1A, the handheld tubing welder 100 includes a tubing shifter 112 that can be positioned adjacent to the tubing retainer 106. As will be described in greater detail below, the tubing shifter 112 can be configured to position, align, shift, and/or abut cut sections of the first tubing 110a and second tubing 110b in order to weld the first tubing 110a to the second tubing 110b. As shown in FIGS. 1A and 1B, the tubing shifter 112 can include a shifter wheel 202 and a keyed clutch 404. The shifter wheel 202 of the tubing shifter 112 can include at least one set of two adjacent shifter slots 114 including a first shifter slot 114a and a second shifter slot 114b arranged to approximately align with the first retainer slot 108a and a second retainer slot 108b, respectively. For example, the first shifter slot 114a and the first retainer slot 108a can align and form a first elongate slot 115a configured to receive and retain the first tubing 110a. Likewise, the second shifter slot 114b and the second retainer slot 108b can align and form a second elongate slot 115b configured to receive and retain the second tubing 110b.

The first elongate slot 115a and the second elongate slot 115b can provide secure positioning of the first tubing 110a and second tubing 110b, respectively, during at least some of the operations of the handheld tubing welder 100, including cutting the tubing 110 prior to welding, moving the blade 116 away from the tubing 110, and pressing the first tube 110a and second tube 110b together to complete the weld. In some embodiments, the keyed clutch 404 can assist with controlling a positioning of the shifter wheel 202 and tubing 110 retained in the shifter slots 114. For example, the keyed clutch 404 can engage with the shifter wheel 202 to rotate the shifter wheel 202 and/or linearly translate the shifter wheel 202 for positioning, aligning, abutting, and/or welding the first tubing 110a to the second tubing 110b, as will be described further below. In some embodiments, the keyed clutch 404 can be coupled to a motor 122 (e.g., a linear rotary motor) that is positioned in the housing 102, as shown in FIG. 1A. For example, the keyed clutch 404 can be coupled to the motor 122 via a shaft 124 extending from and coupled to the motor 122, as shown in FIG. 1B. In some embodiments, the motor 122 can cause the keyed clutch 404 to actuate, rotate, and/or translate along a longitudinal axis of the keyed clutch 404, which can cause at least the shifter wheel 202 to rotate and/or translate. Such control of the shifter wheel 202 can assist with positioning, aligning, abutting, and/or welding the first tubing 110a to the second tubing 110b, as described herein.

In some embodiments, the set of two adjacent shifter slots 114 and the set of two adjacent retainer slots 108 are substantially dimensionally identical (e.g., within standard manufacturing tolerances). For example, in some embodiments, the first shifter slot 114a is substantially dimensionally identical to the first retainer slot 108a. In some embodiments, the set of two adjacent shifter slots 114 and the set of two adjacent retainer slots 108 include different shapes and/or dimensions, however, the adjacent shifter slots 114 and the adjacent retainer slots 108 can approximately align in order to allow retained sections of tubing to approximately align along respective longitudinal axes for effectively welding sections of tubing.

Although the tubing retaining features of the tubing retainer 106 and the shifter wheel 202 are shown and described as including slots extending into a side of the shifter wheel 202 and tubing retainer 106, the handheld tubing welder 100 can include one or more of a variety of tubing retaining features that can secure tubing (e.g., two separate lengths of tubing) for cutting and thermally welding together at least two sections of the tubing. For example, in some embodiments, the tubing retaining feature can include a mechanical securing feature that releasably engages and positions the tubing for at least one of cutting and thermally welding sections of the tubing. Additionally, and/or alternatively, the tubing retaining features (e.g., shifter slots 114 and retainer slots 108) can receive and retain more than one shaped and sized tubing, such as tubing retaining features that can change shape and/or size to accommodate different shaped and sized tubing. For example, in some embodiments the tubing retaining features (e.g., shifter slots 114 and retainer slots 108) are fixed and thus friction and/or compression experienced by the tubing in the tubing retaining features can be a result of a user inserting the tubing in the tubing retaining features having a diameter and/or cross section that is smaller than a diameter of the tubing. In some embodiments, the tubing retaining features can be mechanically adjustable (e.g., a motor, lever, and/or actuator that causes one or more tubing retaining features to pinch tubing).

In some embodiments, a flexible material can be inserted into the shifter slots 114 and/or retainer slots 108 to accommodate different sized tubes 110. In such embodiments, the flexible material is flame resistant and has material properties that prevent the tubing 110 from welding to the flexible material during welding operations. In some embodiments, the handheld tubing welder 100 can include features for customizing the size and/or shape of the tubing retaining features, such as the ability to change out a detachable shifter wheel 202 and/or detachable tubing retainer 106 with modular shifter wheels 202 and/or tubing retainers 106. For example, the detachable tubing retainer 106 with modular shifter wheels 202 and/or tubing retainers 106 can include different sized and shaped tubing retaining features (e.g., shifter slots 114 and retainer slots 108) that best receive and retain a specific type of tubing 110 for welding. In some embodiments, the shifter wheel 202 and/or tubing retainer 106 can include more than one set of tubing retaining features (e.g., shifter slots 114 and retainer slots 108). As such, a user can adjust (e.g., rotate, translate) the shifter wheel 202 and/or tubing retainer 106 until desired tubing retaining features, sizes and/or shapes (e.g., shifter slots 114 and retainer slots 108) are aligned for receiving and retaining tubing 110 for cutting and welding with the handheld tubing welder 100.

As shown in FIG. 1A, a cutting element or blade 116 can be positioned between and/or adjacent to the tubing shifter 112 and the tubing retainer 106. Such positioning can allow the blade 116 to slice through the first tubing 110a and the second tubing 110b retained by the elongate slots 115, which are formed by aligning the shifter slots 114 of the shifter wheel 202 with the retainer slots 108 of the tubing retainer 106. In some embodiments, the blade 116 can be rotatable such that rotation of the blade 116 between at least a part of the tubing shifter 112 and the tubing retainer 106 results in cutting of the first tubing 110a and the second tubing 110b. For example, the keyed clutch 404 can engage with the blade 116 to rotate the blade 116 for cutting the tubing 110, such as in order to allow the first tubing 110a to be welded to the second tubing 110b.

The blade 116 can be arranged and configured to be heated by a heating element 118 contained in the housing 102, as shown in FIG. 1A. For example, the blade 116 can be heated to a temperature sufficient to cut the first tubing 110a and second tubing 110b, as well as allow the first tubing 110a to thermally weld to the second tubing 110b, as will be explained in greater detail below. Additionally, the blade 116 can be heated to the desired temperature for at least a duration that allows the blade 116 to cut through the first tubing 110a and second tubing 110b. In some embodiments, the blade 116 can be cooled and/or the heating element 118 can be deactivated once the blade 116 cuts the tubing 110. In some embodiments, the heating element 118 can include one or more of a thermally conductive heating element, an electrically resistive heating element, and an inductive heating element. For example, the heating element 118 can be coupled to the power supply 104 and/or a controller 120. The controller 120 can be configured to control heating of the blade 116 to a temperature within the desired temperature range for the desired duration or duration range.

For example, the blade 116 can be heated to a temperature that is based on one or more of a variety of features, such as a material and/or dimension of the tubing 110. In some embodiments, the heating element 118 can be positioned within the housing 102, such as to insulate the heating element 118 and prevent user contact with the heating element 118. For example, a portion of the housing 102 can be constructed and/or positioned between the blade 116 and at least a part of the heating element 118. In some embodiments, the blade 116 can include an electrically resistive heating element that causes the blade 116 to increase in temperature upon delivery of an electric current to a part of the blade 116.

In some embodiments, the heating element 118 can include an inductive heating element, and the blade 116 can thus be made of a material compatible with inductive heating, for example, brass, aluminum, copper, steel, and martensitic stainless steel. Similarly, in embodiments with an inductive heating element 118, the housing 102 and other components are made of materials unaffected by inductive heating such that they are not heated as a result of inductive heating of the blade 116, for example, non-conductive materials or materials that require a different inductive frequency to heat when compared to the blade material. As such, the blade 116 can be heated by the heating element 118 while surrounding components at most minimally increase in temperature. The heating element 118 can be configured to heat the blade 116 to a temperature appropriate for cutting through the first tubing 110a and the second tubing 110b and forming a welded joint between the first tubing 110a and the second tubing 110b, for example, between approximately 200° C. and approximately 400° C.

As previously mentioned, the tubing retainer 106 and tubing shifter 112 are configured to receive sections of a first tubing 110a and second tubing 110b. In some embodiments, the first tubing 110a and the second tubing 110b are to be welded to one another such that the first tubing 110a and the second tubing 110b approximately align along respective longitudinal axis and define a continuous flow passage. The first tubing 110a and the second tubing 110b can be formed out of one or more of a variety of materials, such as a plastic material (e.g., polyvinyl chloride (PVC) or thermoplastic elastomer (TPE)). The tubing 110 can be made of other thermally weldable materials or otherwise thermally bondable polymers without departing from this disclosure. In some embodiments, the first tubing 110a and the second tubing 110b are made of the same material. In some instances, the first tubing 110a and the second tubing 110b are made of different materials, for example, in some instances the first tubing 110a is made of PVC and the second tubing 110b is made of TPE, or vice versa.

As shown in FIG. 1B, the handheld tubing welder 100 can include a controller 120 that is in communication with the motor 122 and/or heating element 118. For example, the shaft 124 of the motor 122 can be caused to rotate and/or move along a longitudinal axis of the shaft 124, such as to cause rotational and linear movement of the keyed clutch 404 (e.g., for movement of the blade 116 and/or the shifter wheel 202). The controller 120 can also control the heating element 118, such as for activating the heating element 118 to reach a programmed temperature for a programmed amount of time. Details on the controller 120 and interactions the controller 120 can have with the rest of the components within the handheld tubing welder 100 are described later within this disclosure.

Figure 2:
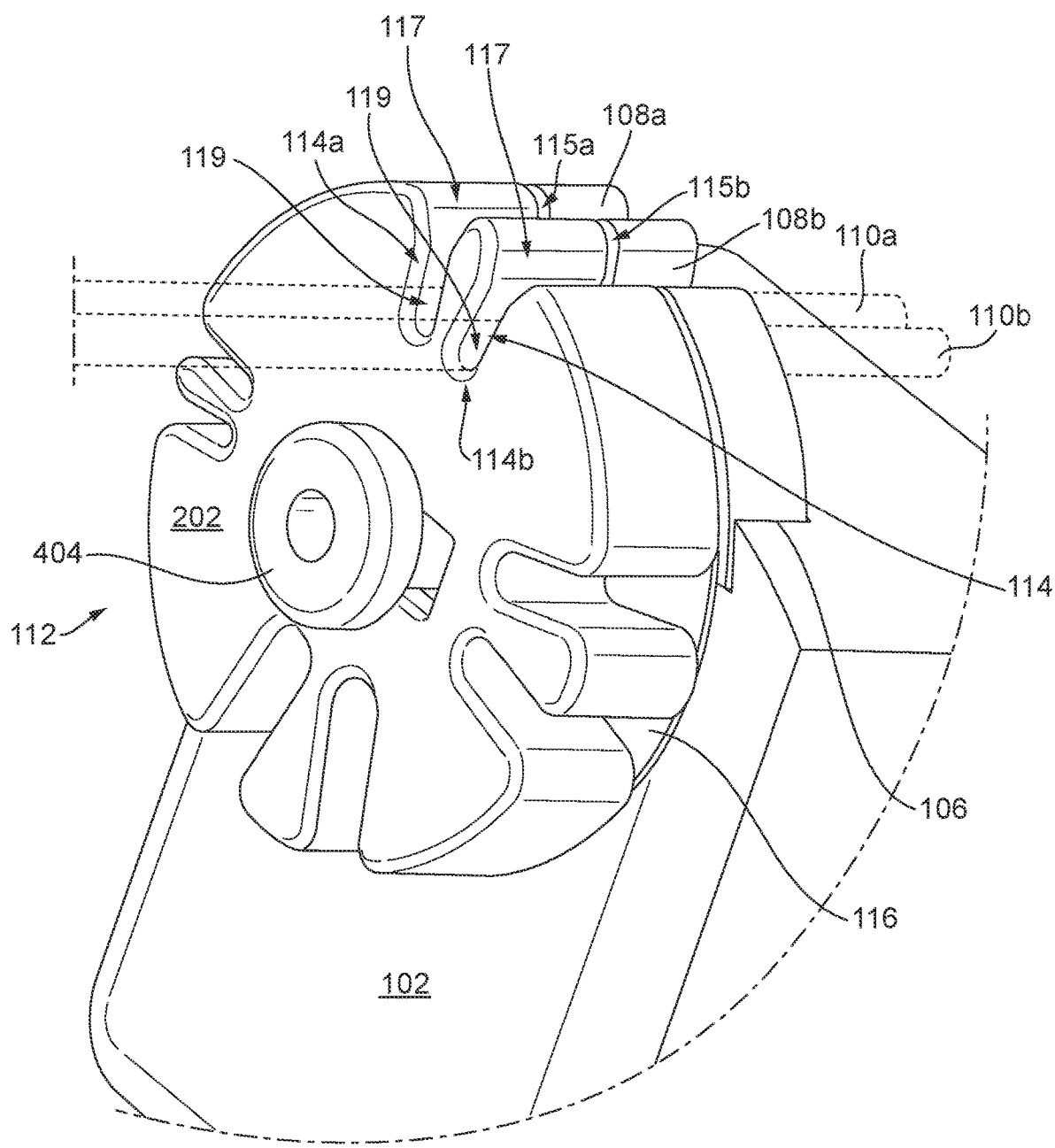
FIG. 2 is a partial perspective view of a first end of a handheld tubing welder according to exemplary embodiments of the present disclosure.
Figure 3:
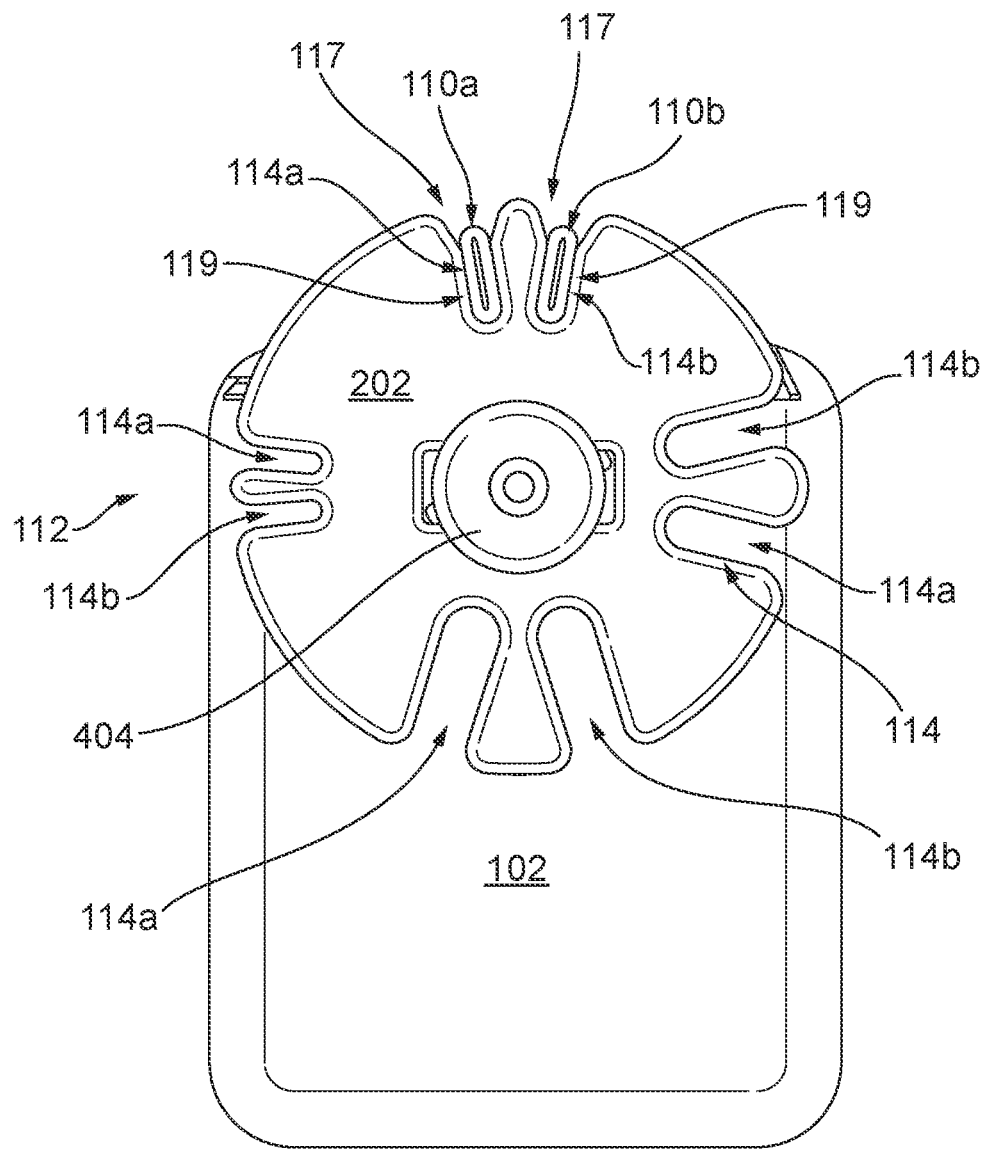
FIG. 3 is an end view of a handheld tubing welder o according to exemplary embodiments of the present disclosure.

FIGS. 2 and 3 illustrate the first tubing 110a and second tubing 110b retained by the shifter wheel 202 of the tubing shifter 112 and the tubing retainer 106 of the handheld tubing welder 100. As shown in FIG. 3, the first tubing 110a and the second tubing 110b can be squeezed, or crimped, within the first shifter slot 114a and the second shifter slot 114b, respectively. For example, the shifter slots 114 can each include a shifter slot opening 117 and a shifter slot tapered portion 119. The shifter slot tapered portion 119 can extend along a length of each shifter slot 114. As shown in FIGS. 2 and 3, the shifter slot tapered portion 119 can include a narrower space between walls forming each shifter slot 114, such as a narrower space extending adjacent the shifter slot opening 117 of each shifter slot 114. Similarly, the first tubing 110a and the second tubing 110b can be squeezed, or crimped, within a first retainer slot 108a and a second retainer slot 108b, respectively. For example, a retainer slot tapered portion (such as retainer slot tapered portion 113 of retainer 106 shown in FIG. 7) of the first retainer slot 108a and/or second retainer slot 108b can retain the first tubing 110a and the second tubing 110b, respectively.

As shown in FIGS. 2 and 3, the shifter wheel 202 can include multiple sets of channels or shifter slots 114, around the perimeter of the shifter wheel 202, such as to accommodate different outer diameters of tubing 110. In some embodiments, multiple interchangeable tubing retainers 106 can be swapped out to correspond with the selected shaped and sized shifter slots 114 of the shifter wheel 202. For example, the shifter wheel 202 can be rotated until a desired pair of shifter slots 114 are approximately aligned with retainer slots 108a and 108b of the tubing retainer 106, as shown in FIG. 2. In some embodiments, the shifter wheel 202 can maintain a rotational position until forced to rotate by the keyed clutch 404. For example, the shifter wheel 202 can be rotated independently relative to the tubing retainer 106 and the blade 116. Similarly, the blade 116 can be rotated independently relative to the shifter wheel 202 and the tubing retainer 106. A single linear rotary motor 122 (FIGS. 1-2) can actuate or rotate the shifter wheel 202, keyed clutch 404 and blade 116. In other embodiments, multiple motors or actuators can be used to actuate or rotate the shifter wheel 202, keyed clutch 404 and blade 116.

Figure 4:
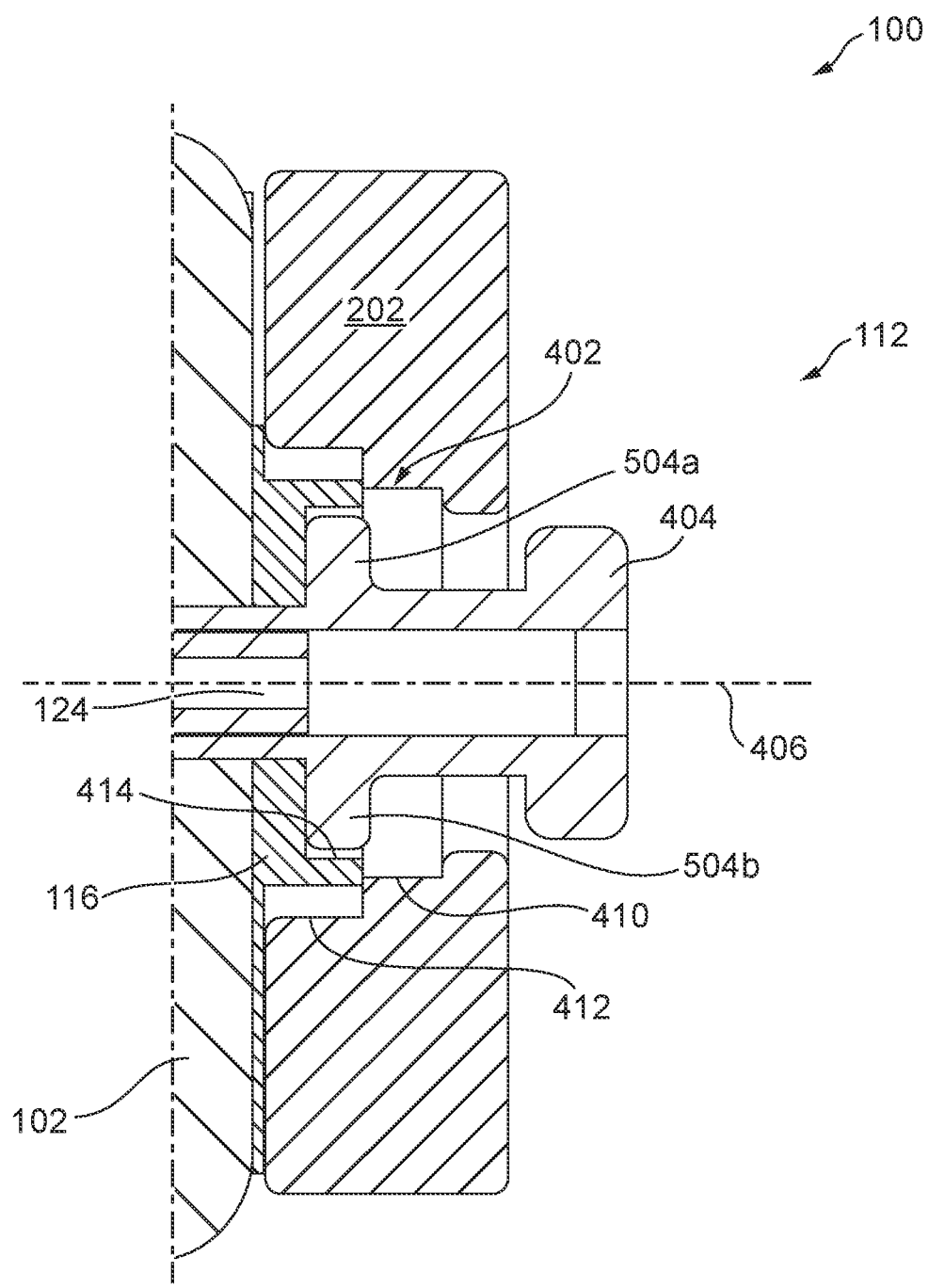
FIG. 4 is a partial top cross-sectional view of a handheld tubing welder and tubing shifter according to exemplary embodiments of the present disclosure.

FIG. 4 illustrates a cross-sectional view of a first end of a handheld tubing welder 100 including a tubing shifter 112 coupled thereto in accordance with exemplary embodiments. The tubing shifter 112 can include a shifter wheel 202, a keyed clutch 404 and a blade 116 coupled to or constructed as part of the housing 102 of the handheld tubing welder 100. The shifter wheel 202, the keyed clutch 404, and the blade 116 are preferably removably, adjustably, and/or rotatably coupled to the housing 102 of the handheld tubing welder 100. The shifter wheel 202 can include an inner profile 402 configured to interact with the keyed clutch 404, such as to allow the keyed clutch 404 to engage with and disengage from the shifter wheel 202. Such engagement and disengagement between the keyed clutch 404 and the shifter wheel 202 can allow for selective movement (e.g., rotational and/or linear translation) of the shifter wheel 202 relative to the housing 102 and/or tubing retainer 106 (shown in FIGS. 1A-1B). For example, the inner profile 402 of the shifter wheel 202 can include an engagement section 410 that is sized and shaped to allow a part of the keyed clutch 404 to engage with the engagement section 410 and cause the shifter wheel 202 to rotate upon rotation of the keyed clutch 404. The inner profile 402 can also include a disengagement section 412 that is sized and shaped to allow a part of the keyed clutch 404 to be disengaged from the shifter wheel 202 such that the shifter wheel 202 is not caused to rotate upon rotation of the keyed clutch 404. Similarly, the blade 116 can include an engagement portion 414 that is sized and shaped to allow a part of the keyed clutch 404 to engage with the blade 116 at the engagement portion 414 such that the blade 116 is caused to rotate upon rotation of the keyed clutch 404.

As shown in FIG. 4, the shifter wheel 202 and the blade 116 can include a longitudinal axis 406 along which the keyed clutch 404 can translate along and/or rotate around. The keyed clutch 404 can be configured and arranged to couple and decouple to the blade 116 and/or the shifter wheel 202 to selectively move (e.g., rotate and/or linearly translate) either the blade 116 or the shifter wheel 202. More specifically, the keyed clutch 404 can include tabs 504a and 504b that extend radially and releasably engage with the blade 116. Engagement of the tabs 504a and 504b with the blade 116 can cause the blade 116 to move (e.g., rotate) and cut the tubing 110. Disengagement of the tabs 504a and 504b from the blade 116 can prevent further and unwanted movement of the blade 116. The keyed clutch 404 can also engage the shifter wheel 202 to move and position sections of tubing 110 retained in the shifter slots 114 for thermal welding a section of the first tubing 110a to a section of the second tubing 110b. For example, once the tubing 110 is cut by the heated blade 116, the cut ends (e.g., formed as a result of the cutting) of the tubing 110 can be at least partially melted (e.g., heated above a melting point of the material). As such, placing at least partially melted and cut ends of first and second tubing sections 110a and 110b in contact with each other facilitates thermal welding and forms a welded joint between the first and second tubing sections 110a and 110b. The keyed clutch 404 can also disengage from the shifter wheel 202 in order to prevent unwanted movement of the shifter wheel 202, such as during some rotational and translational movements of the keyed clutch 404 when movement of the tubing 110 is not desired (e.g., moving the blade 116 to cut the tubing 110).

A motor 122 (shown in FIGS. 1A-B) with shaft 124 can be coupled to the keyed clutch to actuate and position the keyed clutch 404. In various embodiments, the motor 122 and the shaft 124 can be configured and arranged to linearly translate and/or rotate the shaft 124 thereby linearly translating and/or rotating the keyed clutch 404. In various embodiments, the rotational and linear position of the keyed clutch 404, such as relative to the housing 102, can be monitored by position and/or proximity sensors. Such sensors can send signals to the controller 120, which can then determine a current position based on the signals from the sensors. As such, the controller 120 can direct the motor 122 to translate and rotate the shaft 124 to engage and disengage the blade 116 and/or shifter wheel 202, as needed for performing desired operations (e.g., cutting tubing, aligning tubing, abutting tubing, welding tubing, etc.).

Figure 5:
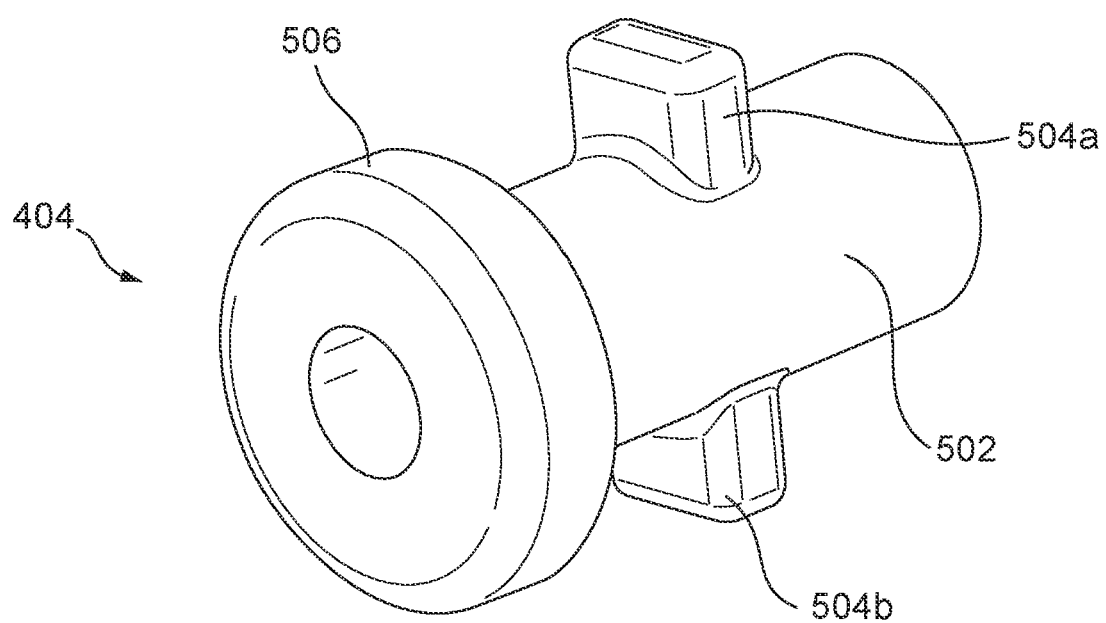
FIG. 5 is a side perspective view of a keyed clutch of a handheld tubing welder according to exemplary embodiments of the present disclosure.

FIG. 5 illustrates an embodiment of the keyed clutch 404 that can include one or more engaging features for releasably engaging the blade 116 and/or shifter wheel 202. As shown in FIG. 5, the keyed clutch 404 can include a main cylindrical body 502 with a first tab 504a and a second tab 504b extending from opposite sides of the cylindrical body 502, such as extending along a same or similar plane. For example, the first and second tabs 504a, 504b can be configured to engage with the engagement section 410 of the shifter wheel 202 (FIG. 4), such as in order to rotate the shifter wheel 202. In some embodiments, the first and second tabs 504a, 504b can be configured to engage with the engagement portion 414 of the blade 116 (FIG. 4), such as in order to rotate the blade 116.

In some embodiments, the keyed clutch 404 can include a shoulder 506 at one end of the cylindrical body 502, as shown in FIG. 5. The shoulder 506 can extend radially out past the outer surface of the cylindrical body 502. For example, the shoulder 506 can be configured to engage with, couple with, interact with, and/or actuate (e.g., push against) a part of the shifter wheel 202 to cause the shifter wheel 202 to linearly translate along the longitudinal axis 406 (FIG. 4). For example, the shoulder 506 can engage with and push against an outer surface or wall 450 (FIG. 6) of the shifter wheel 202 to cause the shifter wheel 202 to linearly translate along the longitudinal axis 406 (FIG. 4) and towards the housing 102 (FIG. 4).

Figure 6:
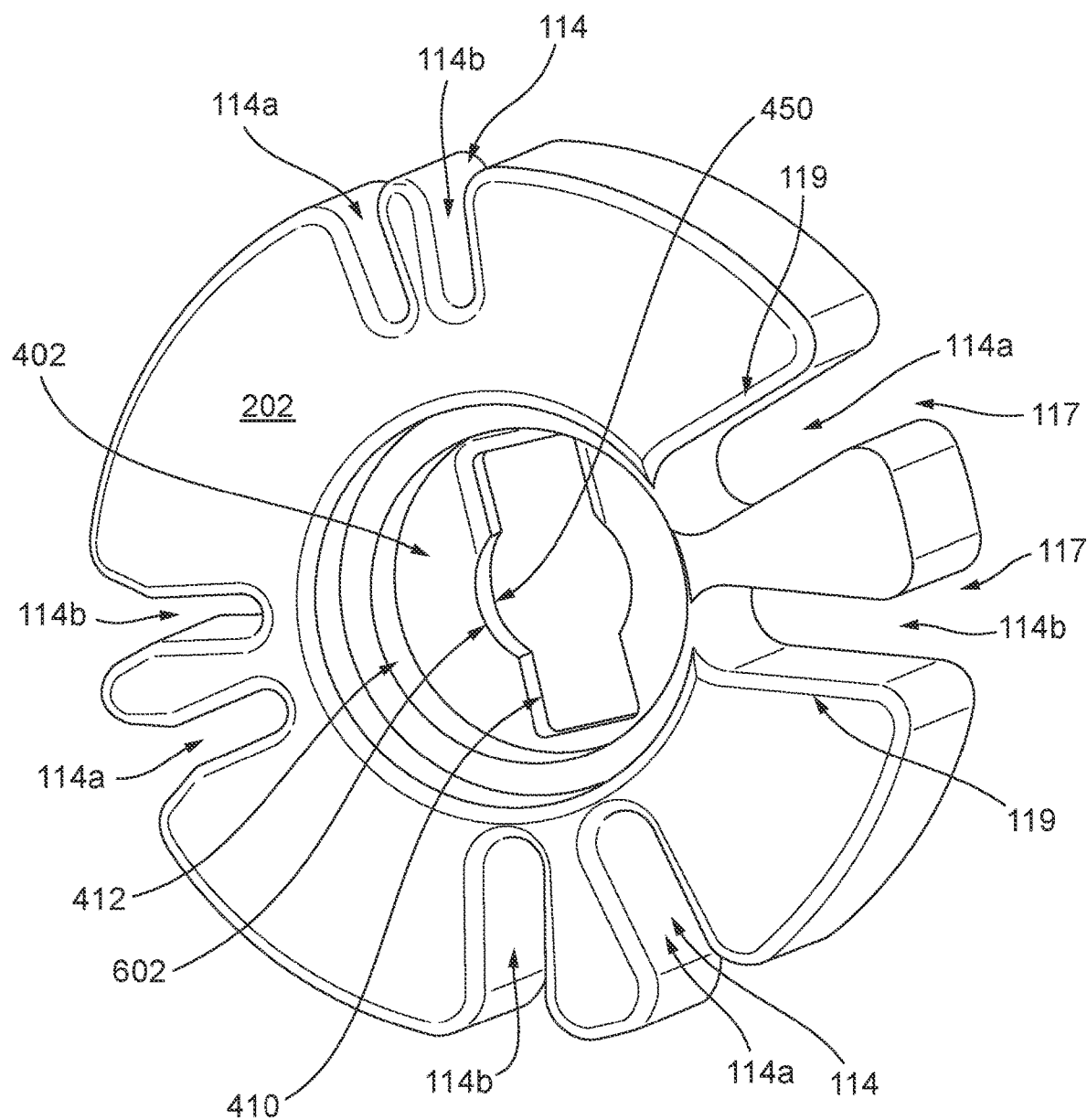
FIG. 6 is a front perspective view of a shifter wheel according to exemplary embodiments of the present disclosure.

FIG. 6 illustrates an exemplary shifter wheel 202 including an inner profile 402 and engagement section 410. The engagement section 410 includes a keyed hub 602 that is similarly shaped to an outer profile of the keyed clutch 404 (FIG. 5) thereby allowing the keyed clutch 404 to engage with the shifter wheel 202 (e.g., to rotate the shifter wheel 202). For example, the first and second tabs 504a, 504b (FIG. 5) of the keyed clutch 404 can engage the keyed hub 602 in order to engage with and control a positioning of the shifter wheel 202. When the first and second tabs 504a, 504b are engaged with the keyed hub 602, the keyed clutch 404 and the shifter wheel 202 can rotate in unison. The inner profile 402 also includes a disengagement section 412 that is void of features for the keyed clutch 404 to interact with. As such, when the first and second tabs 504a, 504b are positioned along the disengagement section 412, the keyed clutch 404 can rotate independent from the shifter wheel 202.

As shown in FIG. 6, the shifter wheel 202 can include more than one set of different shaped and sized shifter slots 114 (e.g., first shifter slot 114a and second shifter slot 114b), such as four or more sets of different shaped shifter slots 114. The shifter wheel 202 can be rotated until a desired set of shifter slots 114 are approximately aligned with the retainer slots 108 of the tubing retainer 106 (FIGS. 1A-2). In some embodiments, the handheld tubing welder 100 can include more than one shifter wheel 202 that each include different variations of sized and shaped shifter slots 114. As such, the shifter wheel 202 can be releasably coupled to the housing 102, such as in order to replace the shifter wheel 202 to accommodate specific tubing (and associated size/diameter and/or material) to be thermally welded by the handheld tubing welder 100.

Figure 7:
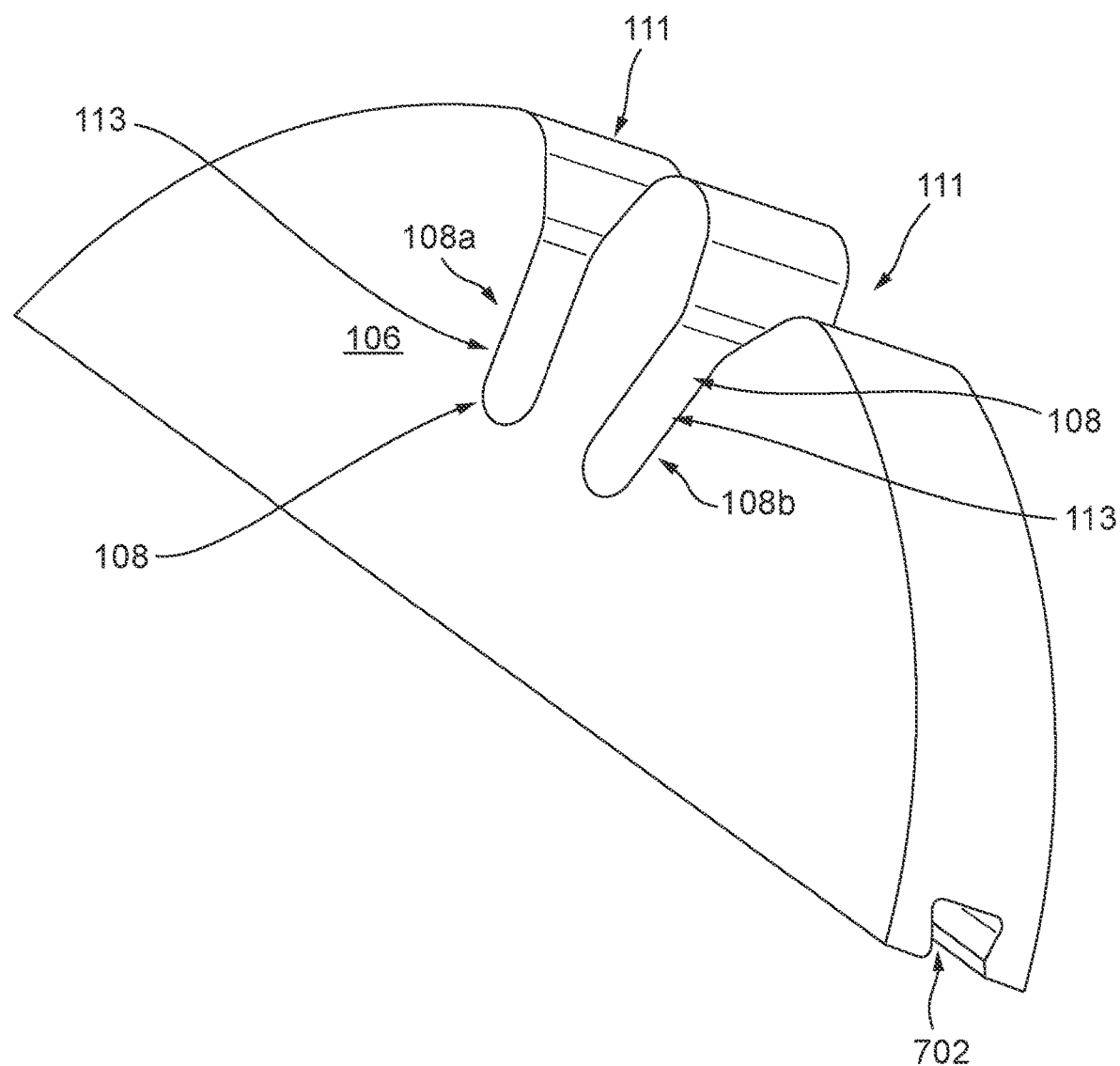
FIG. 7 is a side perspective view of a tubing retainer of a handheld tubing welder according to exemplary embodiments of the present disclosure.

FIG. 7 illustrates an embodiment of the tubing retainer 106 of the handheld tubing welder 100. As previously discussed, the tubing retainer 106 can include retainer slots 108 (e.g., a first retainer slot 108a and second retainer slot 108b) for receiving sections of the first tubing 110a and second tubing 110b (FIG. 1A), respectively. As shown in FIG. 7, the retainer slots 108 can each include a retainer slot opening 111 and a retainer slot tapered portion 113 or space that is smaller than the remainder of the retainer slot 108 and/or smaller than an outer diameter of tubing to be secured by the tubing retainer 106. The retainer slot tapered portion 113 can be shaped to cause the tubing 110 to form a friction and/or compression fit with a respective retainer slot 108, such as to secure a position of the tubing 110 within a respective retainer slot 108. The retainer slots 108 can be sized and shaped to receive and capture a variety of sized and shaped tubing 110, such as tubing 110 having a variety of diameters.

As shown in FIG. 7, the tubing retainer 106 can include a retention slot 702 configured to releasably couple to a corresponding ridge 710 on the housing 102 (FIG. 1B). In some embodiments, the profile of the retention slot 702 and corresponding ridge 710 can include a dove-tail shape, thereby allowing the retention slot 702 and corresponding ridge 710 to have a sliding engagement. For example, the retention slot 702 can be configured to allow the tubing retainer 106 to be releasably secured to the housing 102 (FIG. 1A) during operations and swapped out with various tubing retainers 106 (with different sized first and second retainer slots 108a, 108b). In some embodiments, the tubing retainer 106 can be a part of the housing 102. Other shaped profiles and engagement features, which can form a permanent or releasable engagement of the retention slot 702 and corresponding ridge 710 can be used.

Figure 8:
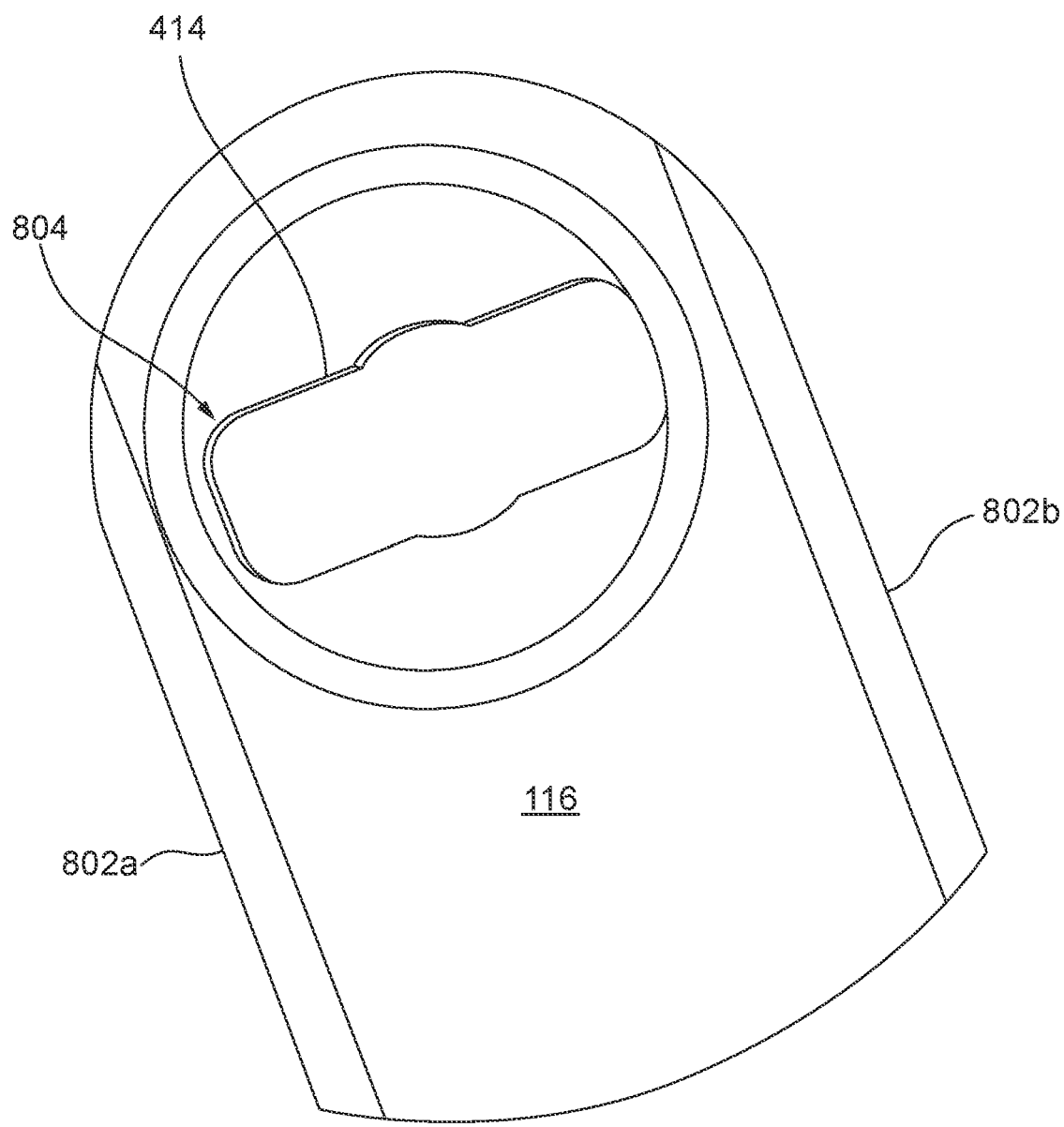
FIG. 8 is a perspective view of a movable blade of a handheld tubing welder according to exemplary embodiments of the present disclosure.

FIG. 8 is a perspective view of a blade 116 that can be incorporated and used with handheld tubing welders herein discloses. The blade 116 includes at least one cutting edge, but can also include a first cutting edge 802*a* and a second cutting edge 802*b*, as shown in FIG. 8. For example, either the first edge 802*a* or the second edge 802*b* can be used to cut the first tubing 110*a* and the second tubing 110*b* (FIGS. 1A-3). As shown in FIG. 8, the blade 116 can include a keyed central profile 804 including an engaging part 414. The keyed central profile 804 can be similarly shaped to an outer profile of the keyed clutch 404 (FIG. 5) thereby allowing the keyed clutch 404 to engage with the blade 116 (e.g., to rotate the blade 116). The first and second tabs 504*a*, 504*b* (FIG. 5) of the keyed clutch 404 can engage the keyed central profile 804 in order to engage with and control a positioning of the blade 116. For example, when the first and second tabs 504*a*, 504*b* are engaged with the keyed central profile 804 of the engaging part 414, the keyed clutch 404 and the blade 116 can rotate in unison, such as to cause the blade 116 to advance either the first edge 802*a* or the second edge 802*b* of the blade 116 through the tubing 110 to cut the tubing 110 for subsequent welding. The keyed clutch 404, including the first and second tabs 504*a*, 504*b*, can be linearly translated to disengage from the keyed central profile 804 in order to allow the keyed clutch 404 to rotate independent from the blade 116.

Figure 9:
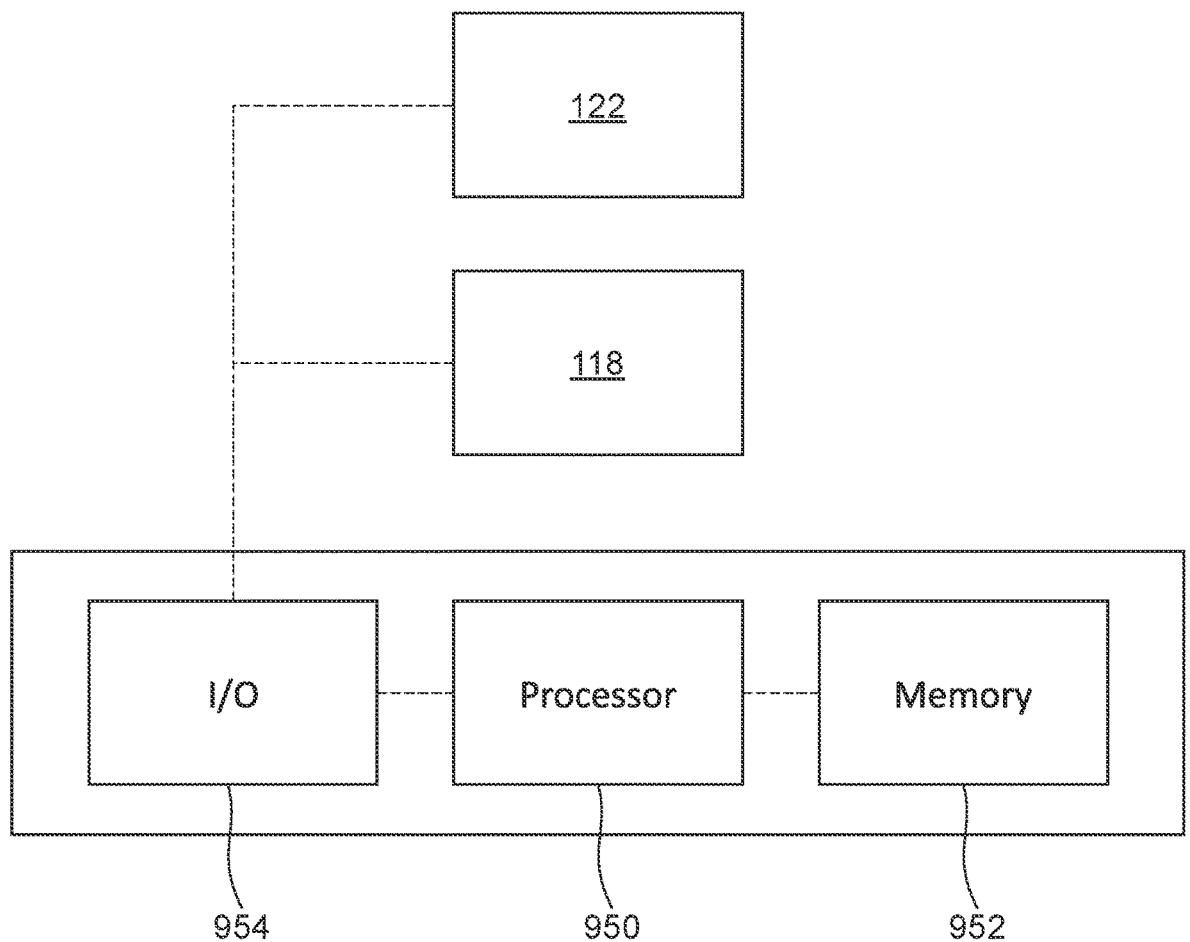
FIG. 9 is a block diagram of an example controller that can be used with and/or incorporated within embodiments of handheld tubing welders according to exemplary embodiments of the present disclosure.

FIG. 9 illustrates a controller 120 that can be used to control operations of exemplary handheld tubing welders herein disclosed. The controller 120 can, among other things, monitor parameters of the handheld tubing welder 100, and send signals to actuate and/or adjust various operating parameters of the handheld tubing welder 100. As shown in FIG. 9, the controller 120 can include one or more processors 950 and non-transitory computer readable memory storage (e.g., memory 952) containing instructions that cause the processors 950 to perform operations. The processors 950 are coupled to an input/output (I/O) interface 954 for sending and receiving communications with components in the system, including, for example, the heating element 118, the motor(s) 122, or other components, such as sensors. In some embodiments, the controller 120 can receive data, such as sensed temperature data that can be analyzed and assist with activating or deactivating one or more components (e.g., heating element 118 and/or motor 122) of the handheld tubing welder 100.

In operation, the controller 120 can be configured to control the heating element 118, for example, by sending a current or signal to the heating element 118 in order to heat the blade 116 in response to an input from a user. The controller 120 can be configured to determine when the blade 116 has reached a target temperature, for example, by receiving and interpreting a signal from a temperature sensor capable of and positioned to detect the temperature of the blade 116. The controller 120 can then send control signals to direct, operate, and/or actuate the motor 122 to couple the keyed clutch 404 to the blade 116 (e.g., engage first tab 504*a* and a second tab 504*b* with engagement portion 414 of blade 116). Once the keyed clutch 404 is coupled to the blade 116, the controller 120 can direct the motor 122 to rotate the blade 116 via the keyed clutch 404 in response to determining the blade 116 has reached a target temperature. Rotation of the blade 116 can be used to cut the first tubing 110*a* and the second tubing 110*b*. The controller 120 can then send control signals to direct the motor 122 to decouple the keyed clutch 404 from the blade 116 and couple the keyed clutch 404 to the shifter wheel 202 (e.g., engage first tab 504*a* and a second tab 504*b* with engagement section 410 of shifter wheel 202). The controller 120 can then send control signals to direct the motor 122 to shift or rotate the shifter wheel 202 about the axis 406 such that the second shifter slot 114*b* of the shifter wheel 202 is moved to align with the first retainer slot 108*a* of the tubing retainer 106 to thereby allow the second tubing 110*b* retained in the second shifter slot 114*b* to align with and weld to the first tubing 110*a* retained in the first retainer slot 108*a* of the tubing retainer 106.

Figure 10A:
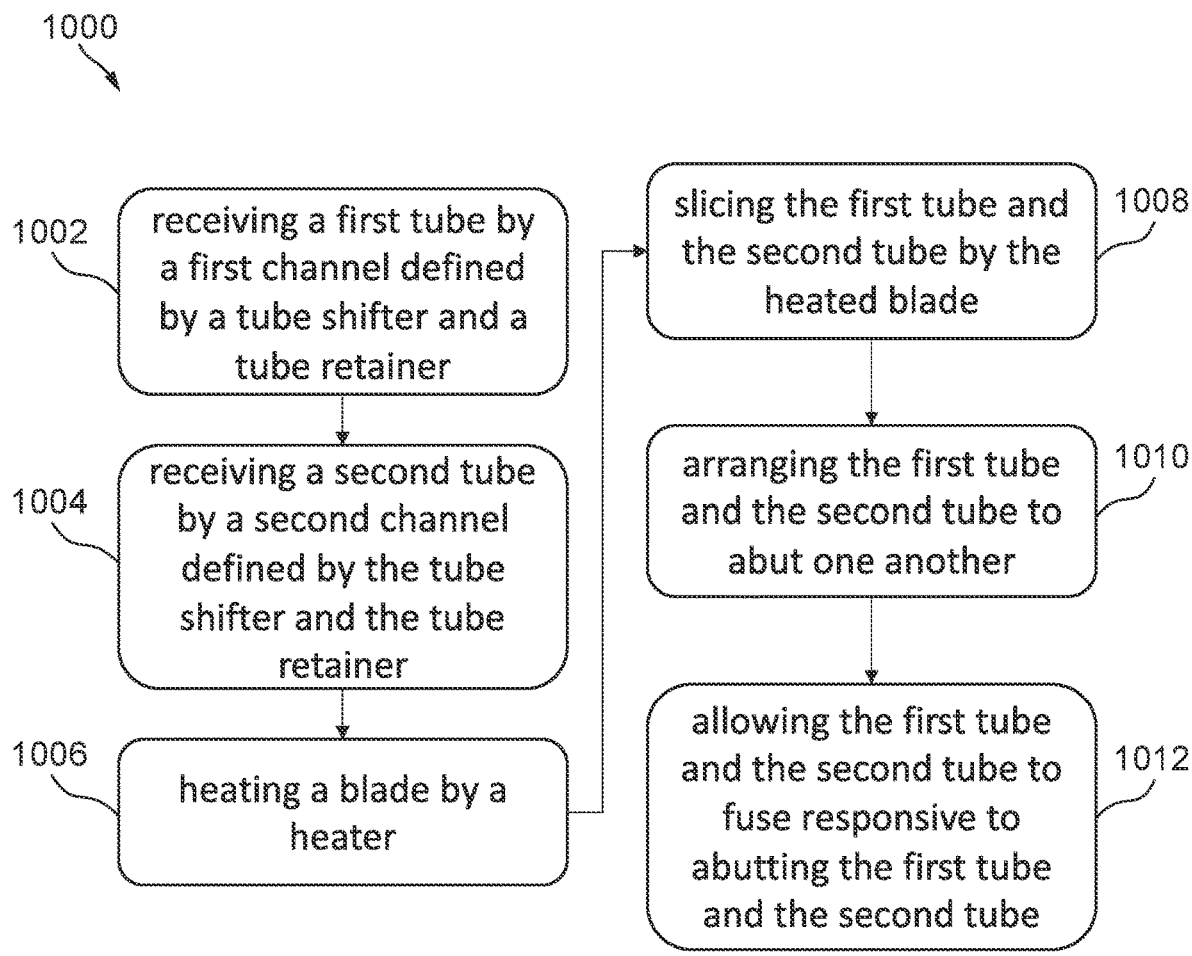
FIG. 10A is a method of operating handheld tubing welders according to exemplary embodiments of the present disclosure.

FIG. 10A is a process flow chart 1000 illustrating features of a method and operation of handheld tubing welders herein disclosed. It will be understood that other embodiments may include or exclude certain features. Additionally, FIGS. 10B-10E illustrate the handheld tubing welder 100 at various stages of operation including aspects of the method of the process flow chart 1000 of FIG. 10A.

Figure 10B:
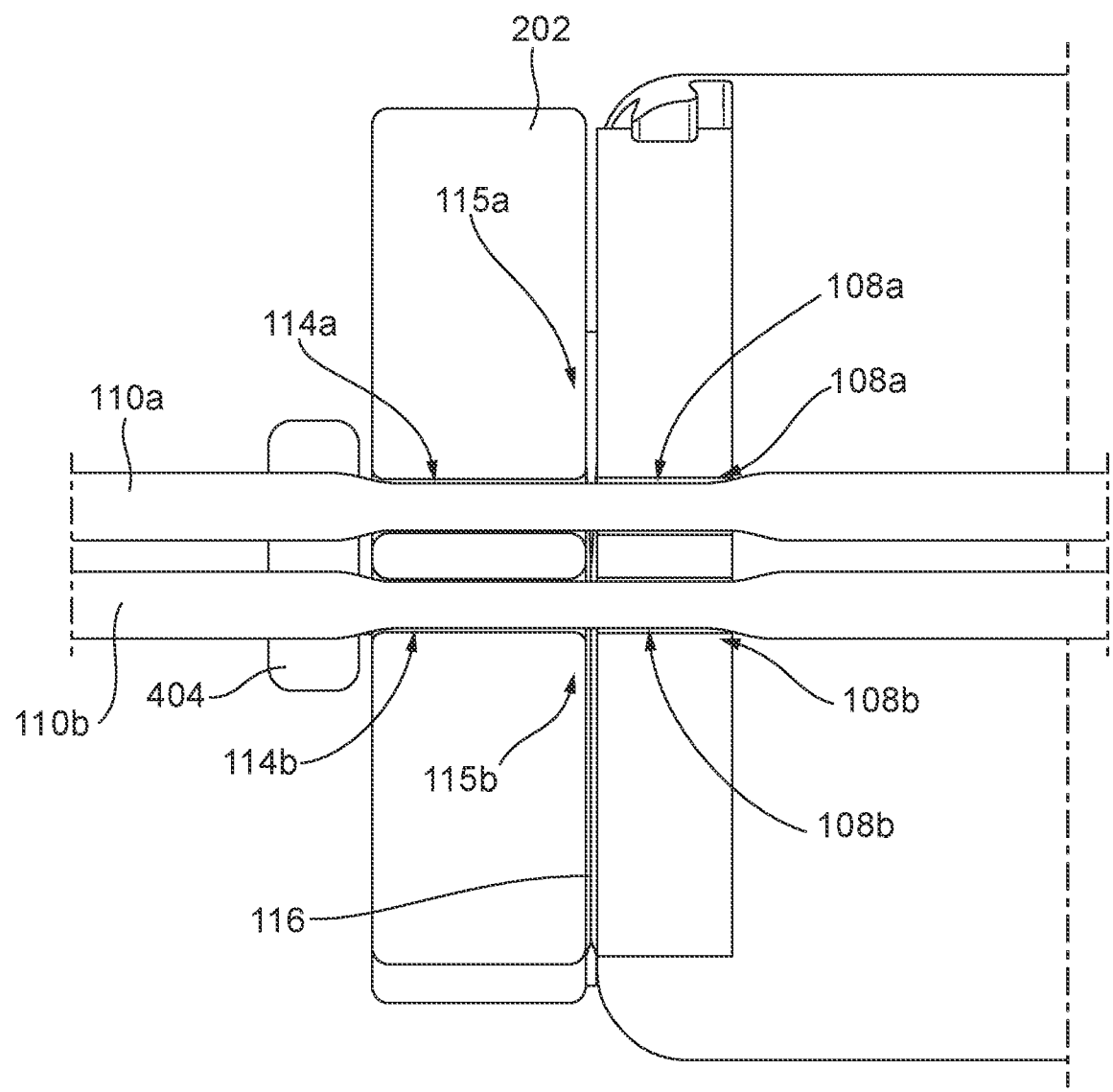
FIGS. 10B-10E show exemplary handheld tubing welders in various stages of operation according to exemplary embodiments of the present disclosure.

As shown in FIG. 10A, at 1003, the first tubing 110*a* is received by the first elongate slot 115*a* defined by the approximately aligned first shifter slot 114*a* and the first retainer slot 108*a*, as shown in FIG. 10B. At 1004, the second tubing 110*b* is received by the second elongate slot 115*b* defined by the approximately aligned second shifter slot 114*b* and the second retainer slot 108*b*, as also shown in FIG. 10B. In some embodiments, the first elongate slot 115*a* and the second elongate slot 115*b* are approximately parallel to one another such that the first tubing 110*a* and the second tubing 110*b* extend approximately parallel to each other, as shown in FIG. 10B.

As shown in the process flow chart 1000 in FIG. 10A, at 1006, the blade 116 is heated by the heating element 118. In some embodiments, a cutting temperature is determined, for example, by the controller 120, responsive to a user input or responsive to temperature sensor readings sent to the controller. Such a user input can include, for example a selection of materials or material properties of the first tubing 110*a* and/or the second tubing 110*b*. For example, the user can indicate that the first tubing 110*a* and/or the second tubing 110*b* are made of TPE or PVC. In some embodiments, the first tubing 110*a* and the second tubing 110*b* are made of the same material, however, the first tubing 110*a* and the second tubing 110*b* can be made of different materials. Alternatively, or in addition, a tubing size and/or dimension can be input by the user. The material and dimension inputs can be used by the controller 120 to determine an appropriate temperature or temperature range the blade 116 as well as process durations are required to reach in order to cut and thermally weld the tubing 110. Once the appropriate temperature or temperature range is determined, the controller 120 can activate the heating element 118 to cause the blade 116 to increase in temperature (e.g., to the appropriate temperature or within the appropriate temperature range).

Figure 10C:
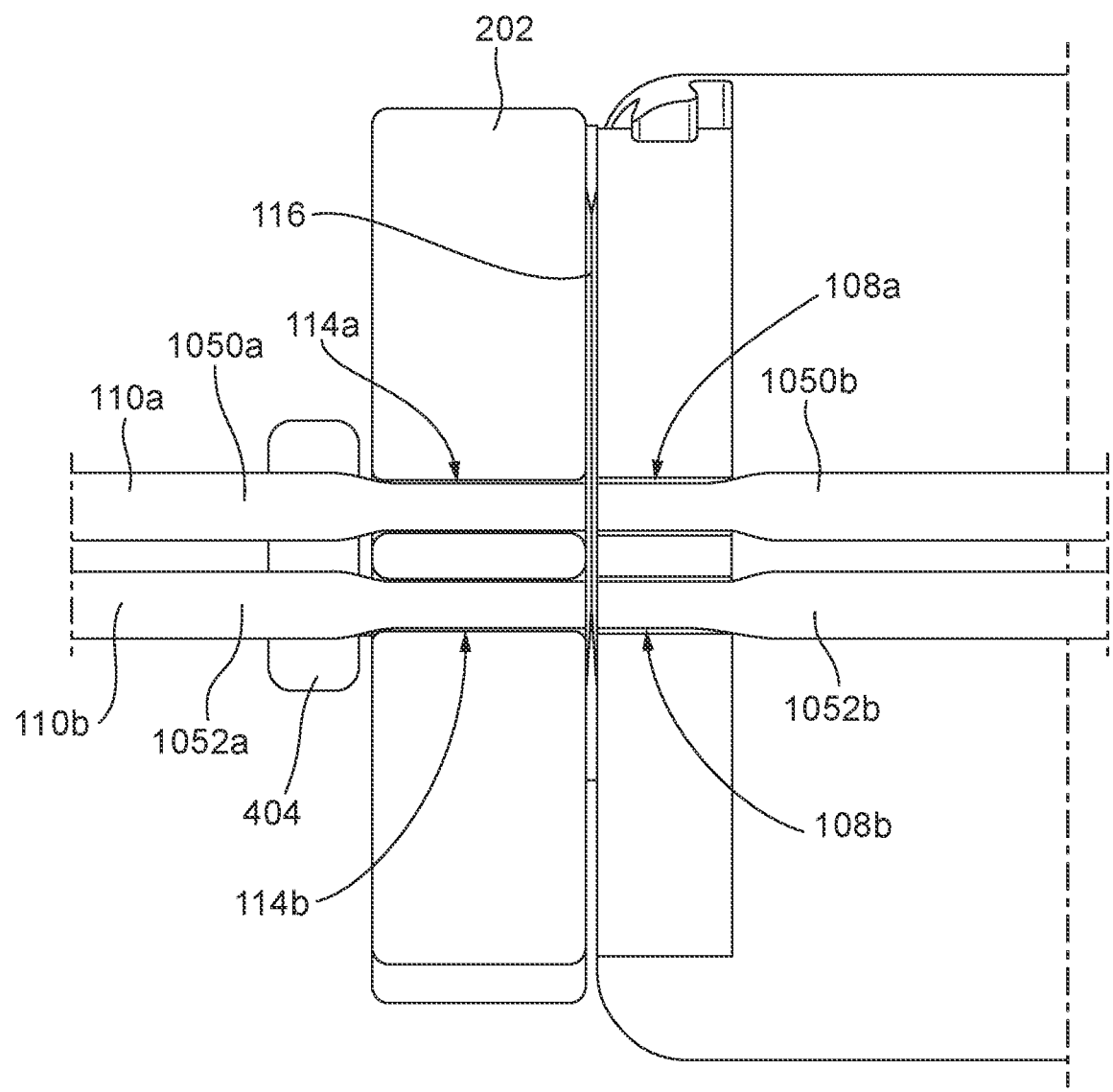

As shown in the process flow chart 1000 in FIG. 10A, at 1008, the first tubing 110*a* and the second tubing 110*b* can be cut by the blade 116 (as illustrated in FIG. 10C), which can be heated to the appropriate temperature or within the appropriate temperature range. For example, the blade 116 can be caused to rotate (by the motor 122 via the keyed clutch 404) between the shifter wheel 202 and the tubing retainer 106 thereby forming a cut across the first tubing 110*a* and the second tubing 110*b*.

Upon rotation of the blade 116, the blade 116 can advance through the first and second tubing 110*a* and 110*b*, thereby cutting the first tubing 110*a* into a first section 1050*a* and a second section 1050*b*, as well as cut the second tubing 110*b* into a first section 1052*a* and a second section 1052*b*, as shown in FIG. 10C. In some instances, the cut formed by the blade 116 forms a gap between the first section 1050*a* and the second section 1050*b* of the first tubing 110*a*, as well as between the first section 1052*a* and the second section 1052*b* of the second tubing 110*b*.

Figure 10D:
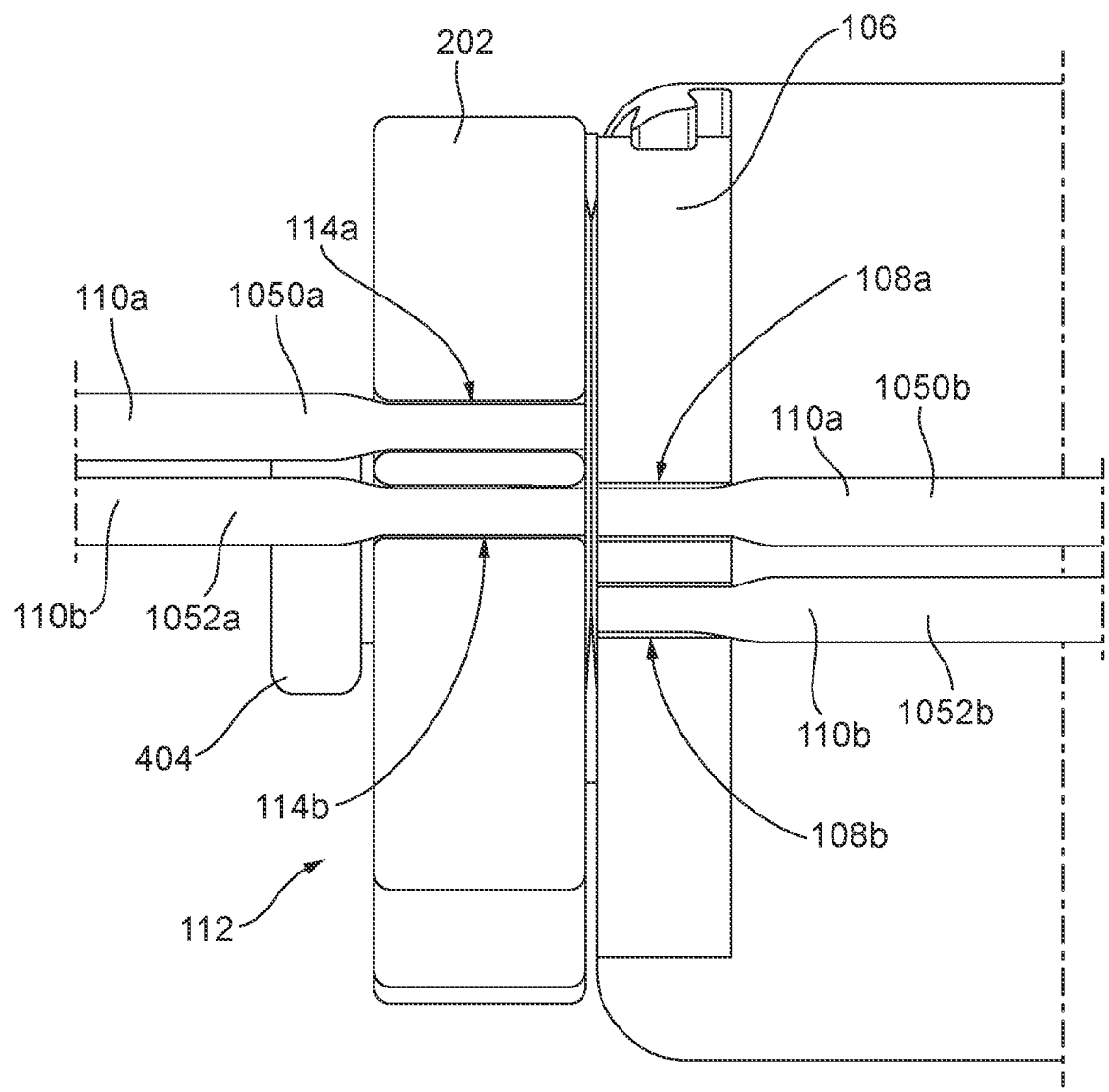
Figure 10E:
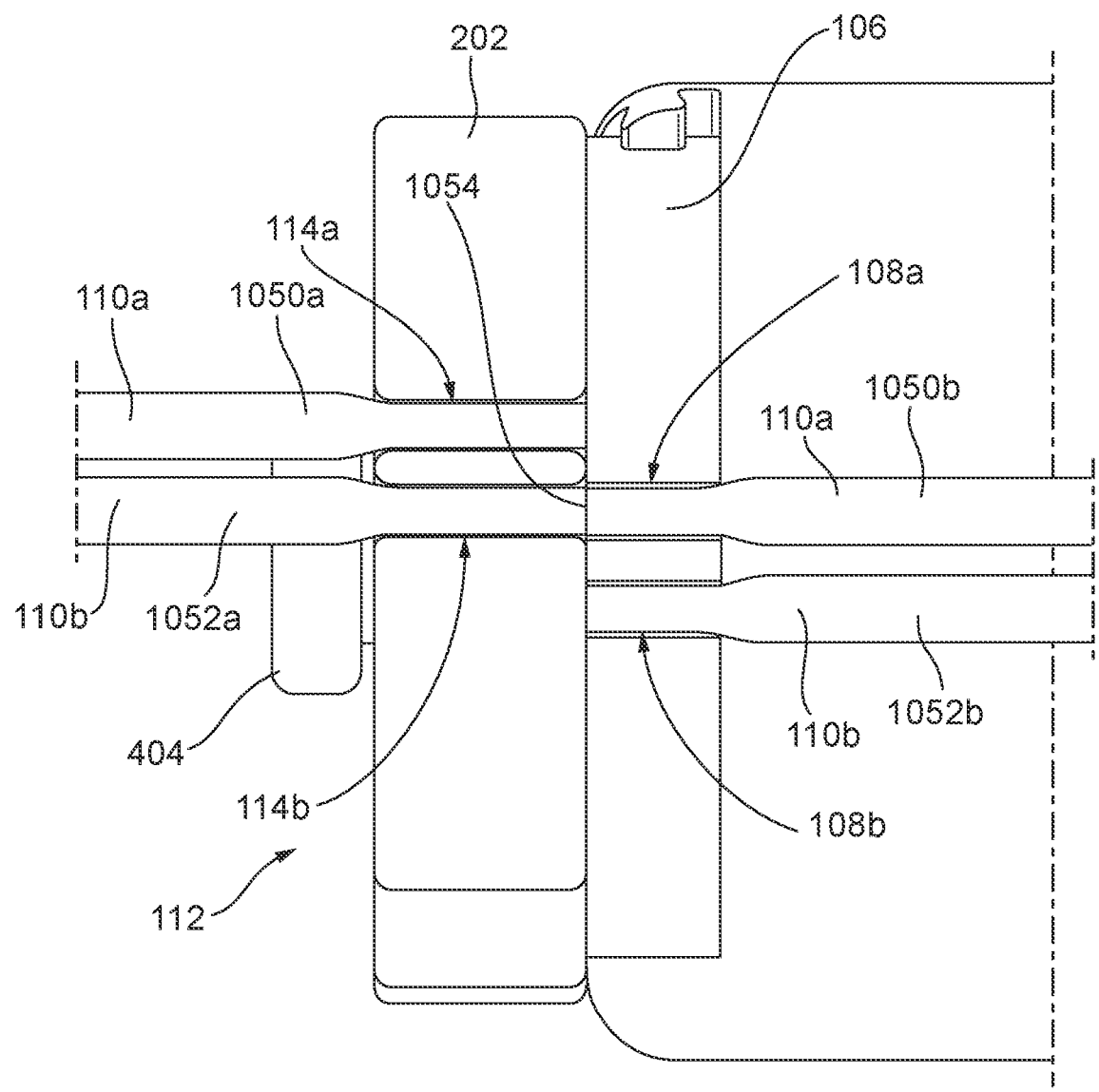

As shown in the process flow chart 1000 in FIG. 10A, at 1010 the shifter wheel 202 can be rotated in order to align or approximately align the first section 1052a of the second tubing 110b with the second section 1050b of the first tubing 110b, as shown in FIG. 10D. Once aligned, the shifter wheel 202 can be moved towards the tubing retainer 106 (e.g., as a result of the keyed clutch 404 advancing shifter wheel 202 towards tubing retainer 106) in order to abut the cut end of the first section 1052a of the second tubing 110b to the cut end of the second section 1050b of the first tubing 110b, as shown in FIG. 10E. The aligning and the abutting of the first section 1052a of the second tubing 110b with the second section 1050b of the first tubing 110b can occur within a duration that allows the cut ends to have a temperature that is approximately greater than a melting point of the material forming the cut ends in order to allow the first section 1052a of the second tubing 110b to thermally weld to the a second section 1050b of the first tubing 110b thereby forming a welded joint 1054 there between, as shown in FIG. 10E.

Figure 11A:
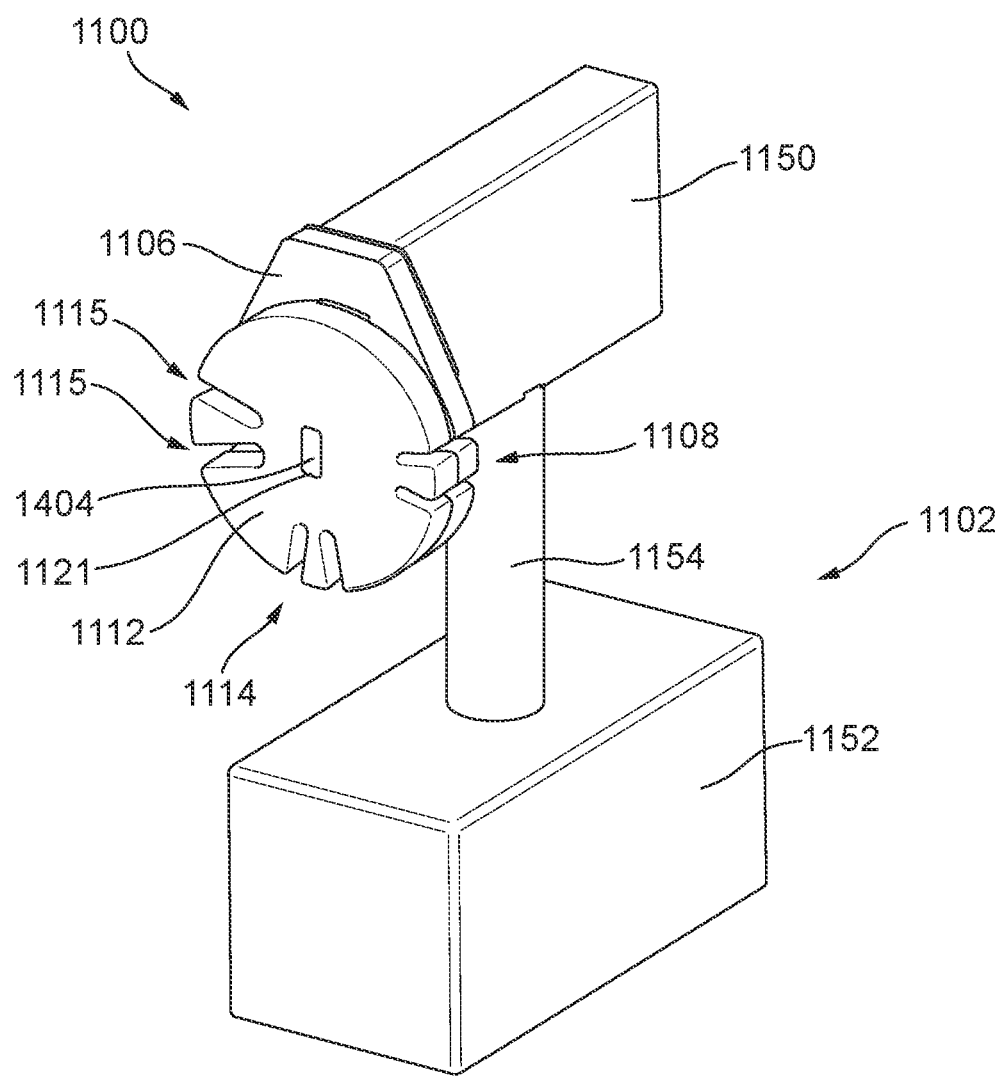
FIG. 11A is a perspective view of a handheld tubing welder according to exemplary embodiments of the present disclosure.

FIG. 11A is a perspective view of another embodiment of the handheld tubing welder 1100. The handheld tubing welder 1100 can include any one or more features and/or functions associated with the handheld tubing welders 100 described above, which will not be repeated here for sake of brevity. As shown in FIG. 11A, the tubing welder 1100 can include a tubing retainer 1106 coupled to a housing 1102. The tubing retainer 1106 can be coupled to the housing 1102 such that the tubing retainer 1106 is in a fixed and/or permanent position relative to the housing 1102. For example, the tubing retainer 1106 can be permanently coupled to and/or prevented from moving relative to the housing 1102. As shown in FIG. 11A, the handheld tubing welder 1100 can also include a tubing shifter 1112 that is movable relative to at least the tubing retainer 1106. For example, the tubing shifter 1112 can rotate along a central axis relative to the tubing retainer 1106.

Figure 11B:
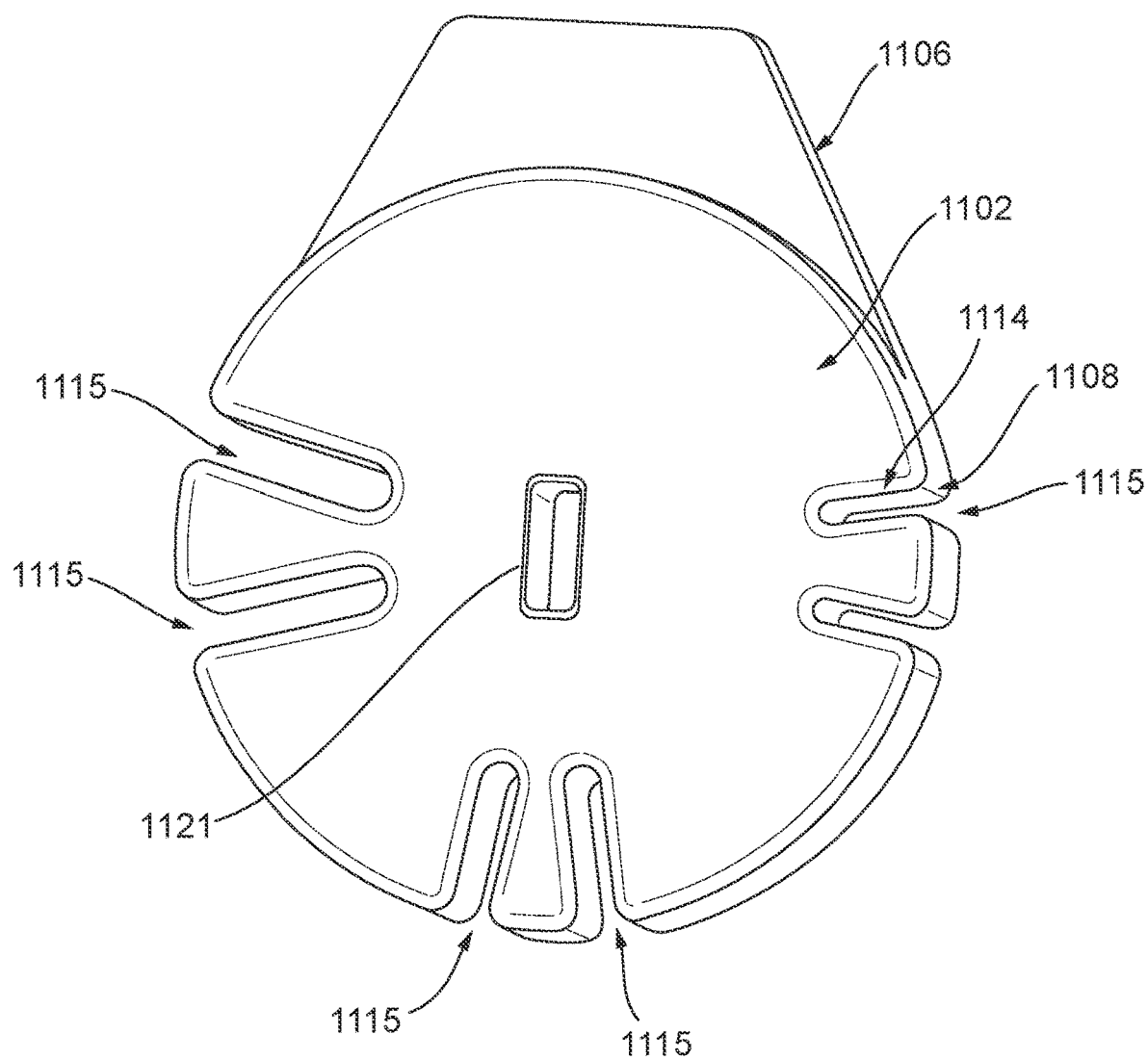
FIG. 11B is a perspective view of a tubing retainer and a tubing shifter according to exemplary embodiments of the present disclosure.

FIG. 11B is a perspective view of the tubing retainer 1106 and the tubing shifter 1102 and showing the tubing shifter 1102 aligned with and in front of the tubing retainer 1106. As shown in FIG. 11B, the tubing retainer 1106 can include one or more pairs of retainer slots 1108, such as three pairs of retainer slots 1108. For example, each pair of retainer slots 108 can be sized to accommodate different sized and/or shaped tubing. As also shown in FIG. 11B, the tubing shifter 1112 can include one or more pairs of shifter slots 1114, such as three pairs of shifter slots 1114 that can also accommodate three different tubing sizes. As shown in FIG. 11B, the pairs of retainer slots 1108 can align with similarly sized pairs of shifter slots 1114 to form a pair of elongate slots 1115 that allow two lengths of tubing to each extend across an elongate slot 1115. Once the tubing is extending across an aligned retainer slot 1108 and shifter slot 1114, a blade associated with the handheld tubing welder 1100 (e.g., a blade positioned between the tubing retainer 1106 and the tubing shifter 1112) can move to cut the tubing. Once cut, the tubing shifter 1112 can rotate relative to the tubing retainer 1106 to align, abut, and weld a first section of a first tubing with a second section of a second tubing. As such, the tubing retainer 1106 can remain fixed relative to the housing 1102 while the tubing shifter 1112 rotates to allow aligning, abutting, and welding of tubing (including tubing having different diameters). The handheld tubing welder 1100 can at least cut, align, abut, and weld tubing of more than one size and/or shape without having to switch out parts, such as the tubing retainer 1106.

As shown in FIG. 11A, a keyed clutch 1404 can extend from the housing 1102 and engage an opening 1121 centrally positioned along the tubing shifter 1112. Once engaged, rotation of the keyed clutch 1404 can cause the tubing shifter 1112 to rotate. In some embodiments, the tubing shifter 1112 can be rotated manually and/or rotated using a motorized device (e.g., stepper motor coupled to keyed clutch 1404, etc.). In some embodiments, any one or more slots (e.g., retainer slot 1108 and/or shifter slot 1114) can be movable and/or associated with an actuator (e.g., lever, motor, etc.) to pinch or compress the tubing extending therealong. In some embodiments, the tubing shifter 1112 can be axially translated to assist with abutting aligned tubing, and such axial translation can be performed manually and/or using a motorized device (e.g., stepper motor coupled to keyed clutch 1404, etc.).

As shown in FIG. 11A, the housing 1102 can include a head 1150 and a base 1152 connected by a stalk 1154. For example, the head 1150 can include a linear rotary motor (such as the linear rotary motor 122 of FIG. 1B) and a power supply and/or a controller (such as the controller 120 of FIG. 1B) can be included within the base 1152.

Figure 12:
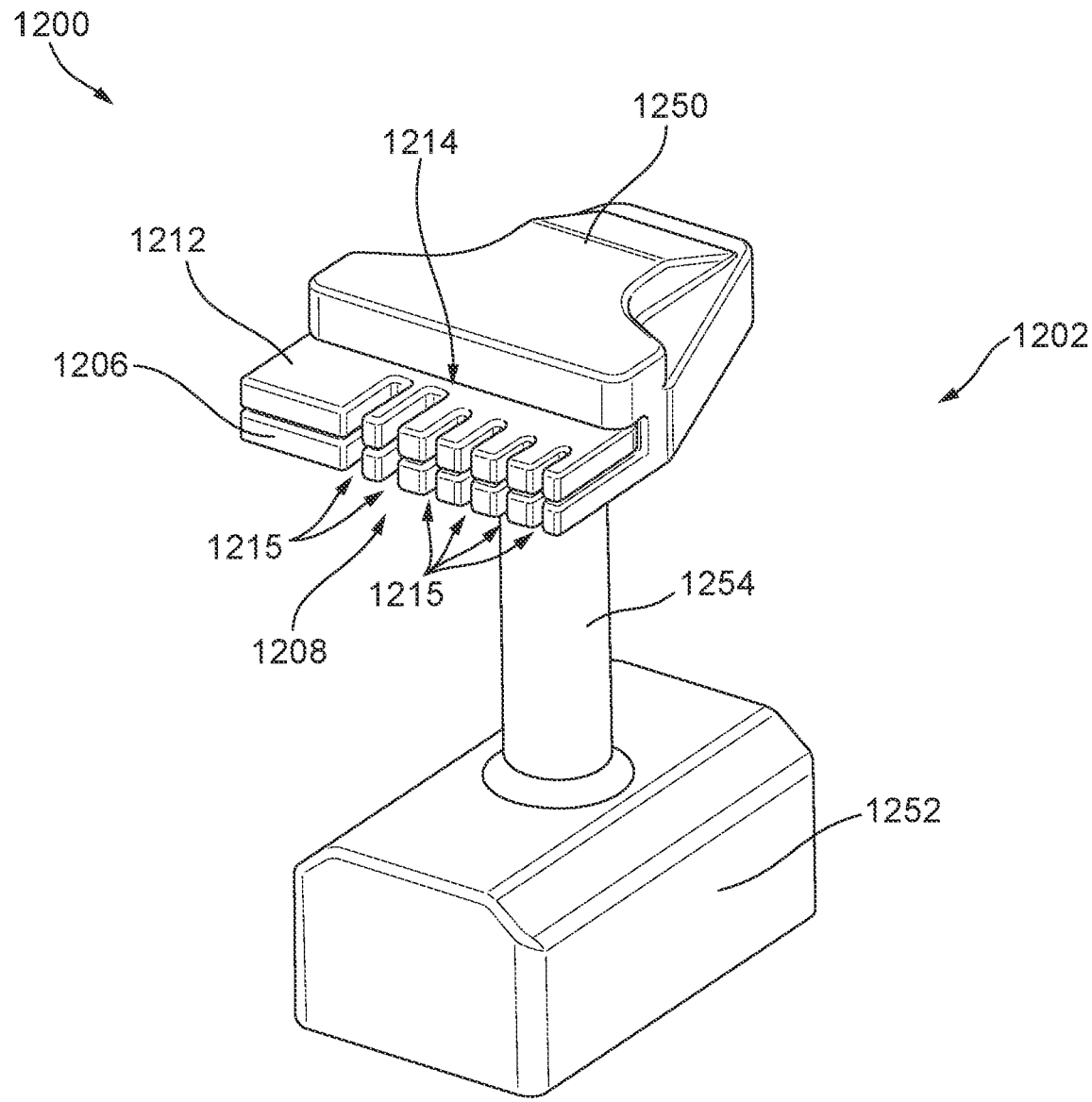
FIG. 12 is a perspective view of a handheld tubing welder according to exemplary embodiments of the present disclosure.

FIG. 12 is a perspective view of another embodiment of the handheld tubing welder 1200. The handheld tubing welder 1200 can include any one or more features and/or functions associated with the handheld tubing welders 100, 1100 described above, which will not be repeated here for sake of brevity. As shown in FIG. 12, the tubing welder 1200 can include a tubing retainer 1206 coupled to a housing 1202. The tubing retainer 1206 can be coupled to the housing 1102 such that the tubing retainer 1106 is in a fixed position relative to the housing 1102. For example, the tubing retainer 1206 can be permanently coupled to and/or prevented from moving relative to the housing 1202. As shown in FIG. 12, the handheld tubing welder 1200 can also include a tubing shifter 1212 that is movable relative to at least the tubing retainer 1206. For example, the tubing shifter 1212 can linearly translate relative to at least the tubing retainer 1206. In some embodiments, the tubing shifter 1212 can linearly translate along a longitudinal axis that is approximately parallel to a longitudinal axis of the tubing retainer 1206.

As shown in FIG. 12, the tubing retainer 1206 can include one or more pairs of retainer slots 1208, such as three pairs of retainer slots 1208. For example, each pair of retainer slots 1208 can be sized to accommodate different sized and/or shaped tubing. As also shown in FIG. 12, the tubing shifter 1212 can include one or more pairs of shifter slots 1214, such as three pairs of retainer slots 1214 that can also accommodate three different tubing sizes. As shown in FIG. 12, the pairs of retainer slots 1208 can be similarly sized and/or shaped and align with the pairs of shifter slots 1214 to form a pair of elongate slots 1215. The pairs of elongate slots 1215 can allow two lengths of tubing to each extend across an elongate slot 1115. Once the two lengths of tubing are extending across a pair of elongate slots 1215, a blade associated with the handheld tubing welder 1200 (e.g., a blade positioned between the tubing retainer 1206 and the tubing shifter 1212) can move to cut the two lengths of tubing (e.g., a first tubing and a second tubing). Once cut, the tubing shifter 1212 can linearly translate relative to the tubing retainer 1206 to align, abut, and weld a first section of the first tubing with a second section of the second tubing. As such, the tubing retainer 1206 can remain fixed relative to the housing 1202 while the tubing shifter 1212 linearly translates to allow aligning, abutting, and welding of more than one different sized and/or shaped tubing. In some embodiments, the tubing shifter 1212 can linearly translate along a longitudinal axis that is approximately parallel to a longitudinal axis of the tubing retainer 1206. For example, the longitudinal axis of the tubing shifter 1212 can extend transverse to the longitudinal axis of the shifter slots 1214. Similarly, the longitudinal axis of the tubing retainer 1206 can extend transverse to the longitudinal axis of the retainer slots 1208. The handheld tubing welder 1200 can at least cut, align, abut, and weld tubing of more than one size and/or shape without having to switch out parts, such as the tubing retainer 1206

As shown in FIG. 12, the housing 1202 can include a head 1250 and a base 1252 connected by a stalk 1254. For example, the head 1250 can include a linear rotary motor (such as the linear rotary motor 122 of FIG. 1B) and a power supply and/or a controller (such as the controller 120 of FIG. 1B) can be included within the base 1252.

While this disclosure contains many specific embodiment details, these should not be construed as limitations on the scope of what may be claimed, but rather as descriptions of features specific to particular embodiments. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

Other embodiments can be within the scope of the following claims.

What is claimed is:

1. A handheld tubing welder, comprising:
   a housing that is configured to be held by a user;
   a tubing retainer coupled to the housing, the tubing retainer including a first retainer slot and a second retainer slot that are configured to receive and retain a first section of a first tubing and a first section of a second tubing, respectively;
   a tubing shifter positioned adjacent the housing and the tubing retainer, the tubing shifter including a first shifter slot and a second shifter slot that are configured to receive and retain a second section of the first tubing and a second section of the second tubing, respectively;
   a cutting element that is movable between the tubing shifter and the tubing retainer to cut the first tubing and second tubing extending between the tubing shifter and tubing retainer;
   a heating element configured to heat the cutting element to within a temperature range that allows the first section of the second tubing to thermally weld to the second section of the first tubing.

2. The handheld tubing welder of claim 1, wherein the first retainer slot comprises a first retainer slot tapered portion and the second retainer slot comprises a second retainer slot tapered portion, the first retainer slot tapered portion being sized to form a friction and/or compression fit with the first section of the first tubing, the second retainer slot tapered portion being sized to form a friction and/or compression fit with the first section of the second tubing.

3. The handheld tubing welder of claim 1, wherein the cutting element is a rotatable blade.

4. The handheld tubing welder of claim 3, wherein the heating element comprises an inductive heating element, and wherein the blade comprises a material configured to be inductively heated.

5. The handheld tubing welder of claim 1, wherein the heating element comprises one or more of a thermally conducting heating element and an electrically resistive heating element.

6. The handheld tubing welder of claim 1, wherein the handheld tubing welder further comprises:
   a portable power supply.

7. The handheld tubing welder of claim 6, wherein the portable power supply is rechargeable.

8. The handheld tubing welder of claim 1, wherein the tubing shifter further comprises:
   a shifter wheel comprising the first shifter slot and the second shifter slot; and
   a keyed clutch configured to linearly translate and/or rotate, the keyed clutch configured to engage with and disengage from the cutting element and/or the shifter wheel.

9. The handheld tubing welder of claim 8, further comprising:
   a motor(s) coupled to the keyed clutch, the motor(s) configured to control the linear translation and/or rotation of the keyed clutch.

10. The handheld tubing welder of claim 9, further comprising a controller configured to:
    direct the heating element to heat the cutting element responsive to an input from a user;
    direct the motor to engage the keyed clutch with the blade;
    determine the blade has reached a temperature within the temperature range;
    direct the motor to rotate the keyed clutch to thereby rotate the blade;
    direct the motor to decouple the keyed clutch from the blade and couple the keyed clutch to the shifter wheel;
    direct the motor to rotate the shifter wheel to approximately align the first section of the second tubing to the second section of the first tubing; and
    direct the motor to engage the keyed clutch with the shifter wheel and linearly translate the shifter wheel towards the tubing retainer to cause the first section of the second tubing to thermally weld to the second section of the first tubing.

11. A method comprising:
    receiving a first tubing by a first elongate slot defined by a tubing shifter and a tubing retainer of a handheld tubing welder;

receiving a second tubing by a second elongate slot defined by the tubing shifter and the tubing retainer, the first elongate slot and the second elongate slot being parallel to one another;

heating a cutting element by a heating element to a temperature within a temperature range;

cutting the first tubing and the second tubing using the heated cutting element, the heated cutting element forming a cut across the first tubing and the second tubing to thereby form a first and second section of the first tubing and a first and second section of the second tubing;

rotating the tubing shifter to approximately align the first section of the second tubing and the second section of the first tubing; and translating the tubing shifter towards the tubing retainer to abut the first section of the second tubing to the second section of the first tubing to thereby allow the first section of the second tubing to thermally weld to the second section of the first tubing.

12. The method of claim 11, wherein the first elongate slot comprises a first retainer slot tapered portion and the second elongate slot comprises a second retainer slot tapered portion, the first retainer slot tapered portion being sized to form a friction and/or compression fit with the first section of the first tubing, the second retainer slot tapered portion being sized to form a friction and/or compression fit with the first section of the second tubing.

13. The method of claim 11, wherein the rotating comprises:

activating a motor to cause the tubing shifter to rotate along a longitudinal axis.

14. The method of claim 13, wherein the translating comprises:

activating a motor to cause the tubing shifter to linearly translate along the longitudinal axis.

15. The method of claim 13, wherein the motor is a linear rotary motor.

16. The method of claim 11, wherein the first tubing comprises thermoplastic elastomer (TPE).

17. The method of claim 11, wherein the second tubing comprises polyvinyl chloride (PVC).

18. The method of claim 11, wherein the first tubing and the second tubing are different materials.

19. The method of claim 11, further comprising determining the temperature range responsive to a user input.

20. The method of claim 19, wherein the user input comprises one or more of a type of material and a dimension of the first tubing and/or the second tubing.

* * * * *